US00RE44511E

(19) United States
(12) Reissued Patent
Kim et al.

(10) Patent Number: US RE44,511 E
(45) Date of Reissued Patent: Oct. 1, 2013

(54) DRUM TYPE WASHING MACHINE

(75) Inventors: Na Eun Kim, Seoul (KR); Jin Woong Kim, Seoul (KR); Young Hwan Park, Seoul (KR); Jae Won Chang, Gunpo-si (KR)

(73) Assignee: LG Electronics Inc., Seoul (KR)

(21) Appl. No.: 13/116,114

(22) Filed: May 26, 2011

Related U.S. Patent Documents

Reissue of:
(64) Patent No.: 7,536,882
Issued: May 26, 2009
Appl. No.: 11/727,836
Filed: Mar. 28, 2007

(30) Foreign Application Priority Data

Mar. 29, 2006 (KR) ..... 10-2006-0028358
Apr. 12, 2006 (KR) ..... 10-2006-0033255

(51) Int. Cl.
*D06F 37/22* (2006.01)

(52) U.S. Cl.
USPC ..... 68/24; 68/140

(58) Field of Classification Search
USPC ..... 68/24, 58, 140–147
See application file for complete search history.

(56) References Cited

U.S. PATENT DOCUMENTS

| | | | |
|---|---|---|---|
| 912,038 | A | 2/1909 | Seifert |
| 1,077,043 | A | 10/1913 | Darrow |
| 1,470,245 | A | 10/1923 | Slider |
| 1,611,865 | A | 12/1926 | Ahlm |
| 1,611,895 | A | 12/1926 | Dienner |
| 1,657,181 | A | 1/1928 | Sando |
| 1,787,427 | A | 1/1931 | Eckhard |
| 2,089,066 | A | 8/1937 | Morrill |
| 2,096,649 | A | 10/1937 | Rasanen |
| 2,152,458 | A | 3/1939 | Bergman |
| 2,153,418 | A | 4/1939 | Haberstump |
| 2,165,884 | A | 7/1939 | Chamberlin et al. |
| 2,191,607 | A | 2/1940 | Chamberlin et al. |

(Continued)

FOREIGN PATENT DOCUMENTS

| | | |
|---|---|---|
| CN | 2423308 Y | 3/2001 |
| CN | 1293276 | 5/2001 |

(Continued)

OTHER PUBLICATIONS

U.S. Office Action dated Dec. 30, 2005 issued in U.S. Appl. No. 10/461,451.

(Continued)

*Primary Examiner* — Frankie L Stinson
(74) *Attorney, Agent, or Firm* — KED & Associates LLP

(57) ABSTRACT

A drum type washing machine is provided, in which vibration is efficiently attenuated, by a maximum capacity within a size-fixed cabinet is provided, and by which a user does not bend over or sit down to load laundry into the washing machine. The drum type washing machine includes a cabinet forming an exterior of the drum type washing machine, a tub fixed within the cabinet, the tub having a laundry loading entrance at an outer circumference of the tub, a drum rotatably provided within the tub, the drum having an opening on a lateral side of the drum to communicate with the laundry loading entrance of the tub, a motor assembly provided next to one side of the drum to rotate the drum, and a suspension assembly provided to support a weight of the drum and attenuate vibration of the drum.

13 Claims, 10 Drawing Sheets

(56) References Cited

U.S. PATENT DOCUMENTS 2,217,351 A * 10/1940 Soderquist ..... 210/365
2,230,345 A 2/1941 Bradbury
2,278,911 A 4/1942 Breckenridge
2,296,257 A 9/1942 Breckenridge
2,296,261 A 9/1942 Breckenridge et al.
2,296,267 A 9/1942 Baird
2,323,765 A 7/1943 Haberstump
2,331,897 A 10/1943 Dyer
2,356,816 A 8/1944 Breckenridge et al.
2,356,818 A 8/1944 Bruckman
2,389,774 A 11/1945 Haberstump
2,408,509 A 10/1946 Clark
2,434,476 A 1/1948 Wales
2,498,181 A 2/1950 Reiter
2,509,516 A 5/1950 Murphy
2,510,836 A 6/1950 Russell et al.
2,521,578 A 9/1950 Haberstump
2,526,002 A 10/1950 Brotman
2,526,048 A 10/1950 Russell
2,526,444 A 10/1950 Woodson
2,527,239 A 10/1950 Woodson
2,541,166 A 2/1951 Leef
2,542,509 A 2/1951 Goriup
2,555,269 A 5/1951 Chamberlin
2,556,490 A 6/1951 Chamberlin
2,565,604 A 8/1951 Geiger
2,579,472 A 12/1951 Chamberlin et al.
2,579,836 A 12/1951 Lee et al.
2,589,284 A 3/1952 O'Neil
2,593,752 A 4/1952 Haberstump
2,615,320 A 10/1952 Belaieff
2,620,070 A 12/1952 Dodge
2,629,245 A * 2/1953 Chamberlin ..... 68/23.1
2,644,326 A 7/1953 Worst
2,652,708 A 9/1953 Rimsha et al.
2,656,700 A 10/1953 Smith
2,664,326 A 12/1953 Kuzmick
2,711,297 A 6/1955 Thiele
2,717,135 A 9/1955 Douglas
2,737,799 A 3/1956 Knipmeyer
2,757,531 A 8/1956 Fox
2,758,685 A 8/1956 Sisson
2,774,621 A 12/1956 Kilbourne, Jr.
2,785,557 A 3/1957 Stilwell, Jr.
2,836,046 A 5/1958 Smith
2,843,314 A 7/1958 Hansen
2,844,225 A 7/1958 Hubbard et al.
2,844,255 A 7/1958 Cavenah et al.
2,859,877 A 11/1958 Sisson
2,873,599 A 2/1959 Buechler
2,882,706 A 4/1959 Brucken
2,893,135 A 7/1959 Smith
2,895,319 A 7/1959 Rochefort
2,908,871 A 10/1959 McKay
2,930,217 A 3/1960 Rehmke
2,937,516 A 5/1960 Czaika
2,957,330 A 10/1960 Cline
2,959,966 A 11/1960 Bochan
2,972,877 A 2/1961 Platt
2,975,528 A 3/1961 Shewmon
2,984,094 A 5/1961 Belaieff
2,986,914 A 6/1961 Brucken
2,987,189 A 6/1961 Evjen
2,987,190 A 6/1961 Bochan
2,990,706 A 7/1961 Bochan
2,995,023 A 8/1961 Douglas
2,995,918 A * 8/1961 Neidenthal et al. ..... 68/23.1
3,048,026 A 8/1962 Bochan et al.
3,058,331 A 10/1962 Anthony
3,066,522 A 12/1962 Steinmüller
3,073,668 A 1/1963 Rothenberger
3,089,326 A 5/1963 Belaieff
3,098,581 A 7/1963 Marsilio
3,135,688 A 6/1964 Compans
3,153,951 A 10/1964 Whelan
3,178,916 A 4/1965 Belaieff et al.
3,197,983 A 8/1965 Ilmer
3,206,267 A 9/1965 Gruner et al.
3,248,908 A 5/1966 Pope
3,257,830 A 6/1966 Shelton
3,273,361 A 9/1966 Smith
3,280,603 A 10/1966 Schwamm
3,333,444 A 8/1967 Bochan
3,356,222 A 12/1967 Belaieff
3,362,198 A 1/1968 Barito
3,389,881 A 6/1968 Stelwagen
3,391,469 A 7/1968 Reeder
3,459,461 A 8/1969 Bannon, Jr.
3,477,259 A 11/1969 Barnish et al.
3,503,228 A 3/1970 Lake
3,509,742 A 5/1970 Bauer
3,531,954 A 10/1970 Krupsky
3,742,738 A 7/1973 Frotriede
3,783,653 A 1/1974 Haerick
3,799,348 A * 3/1974 Mazza ..... 210/144
3,927,542 A 12/1975 de Hedouville et al.
3,952,557 A 4/1976 Bochan
4,114,406 A 9/1978 Horowitz et al.
4,295,387 A 10/1981 Zhivotov et al.
4,321,302 A 3/1982 Umeki et al.
4,327,302 A 4/1982 Hershberger
4,412,390 A 11/1983 Grant
4,437,325 A 3/1984 Hershberger
4,446,706 A 5/1984 Hartwig
4,498,181 A 2/1985 Menown et al.
4,618,193 A 10/1986 Cuthbert et al.
4,771,253 A 9/1988 Sasaki et al.
4,819,460 A 4/1989 Obradovic
4,989,684 A 2/1991 Conaway
5,038,586 A 8/1991 Nukaga et al.
5,080,204 A 1/1992 Bauer et al.
5,199,690 A 4/1993 Marshall
5,209,458 A 5/1993 Eubank et al.
5,230,229 A 7/1993 Stadelmann et al.
5,267,456 A 12/1993 Nukaga et al.
5,280,660 A 1/1994 Pellerin et al.
5,433,091 A 7/1995 Durazzani et al.
5,526,657 A 6/1996 Johnson
5,548,979 A 8/1996 Ryan et al.
5,570,597 A * 11/1996 Bongini et al. ..... 68/17 R
5,657,649 A 8/1997 Lim
5,678,430 A 10/1997 Merlin et al.
5,711,170 A 1/1998 Johnson
5,711,171 A 1/1998 Uhlin
5,737,944 A 4/1998 Nishimura et al.
5,768,730 A 6/1998 Matsumoto et al.
5,842,358 A 12/1998 Koo et al.
5,870,905 A 2/1999 Imamura et al.
5,907,880 A * 6/1999 Durazzani et al. ..... 8/159
5,913,951 A 6/1999 Herr et al.
5,924,312 A 7/1999 Vande Haar
5,961,105 A 10/1999 Ehrnsberger et al.
5,979,195 A 11/1999 Bestell et al.
6,006,553 A 12/1999 Lee et al.
6,032,494 A 3/2000 Tanigawa et al.
6,122,843 A 9/2000 Noguchi et al.
6,148,647 A 11/2000 Kabeya et al.
6,343,492 B1 2/2002 Seagar et al.
6,363,756 B1 4/2002 Seagar et al.
6,460,382 B1 10/2002 Kim et al.
6,474,114 B1 11/2002 Ito et al.
6,477,867 B1 11/2002 Collecutt et al.
6,481,035 B2 11/2002 Seagar et al.
6,510,715 B1 1/2003 Simsek et al.
6,510,716 B1 1/2003 Kim et al.
6,516,638 B1 2/2003 Myerscough
6,539,753 B1 4/2003 Ito et al.
6,557,383 B1 5/2003 Ito et al.
6,564,594 B1 5/2003 Ito et al.
6,578,225 B2 6/2003 Jönsson
6,578,391 B2 6/2003 Seagar et al.
6,612,138 B2 9/2003 Ryu et al.
6,626,014 B2 9/2003 Heyder et al.
6,662,682 B2 * 12/2003 Stalsberg ..... 74/572.4

| | | | |
|---|---|---|---|
| 6,681,602 | B2 | 1/2004 | Heyder et al. |
| 6,782,722 | B2 | 8/2004 | Yokoi et al. |
| 6,968,632 | B2 | 11/2005 | Guinibert et al. |
| 6,981,395 | B2 | 1/2006 | Ryu et al. |
| 7,013,682 | B2 | 3/2006 | Sharrow |
| 7,065,905 | B2 | 6/2006 | Guinibert et al. |
| 7,073,356 | B2 | 7/2006 | Nakamura et al. |
| 7,117,613 | B2 | 10/2006 | Guinibert et al. |
| 7,225,562 | B2 | 6/2007 | Guinibert et al. |
| 7,249,742 | B2 | 7/2007 | Guinibert et al. |
| 7,257,905 | B2 | 8/2007 | Guinibert et al. |
| 7,334,799 | B2 | 2/2008 | O'Hara |
| 7,412,783 | B2 | 8/2008 | Guinibert et al. |
| 7,467,483 | B2 | 12/2008 | Guinibert et al. |
| 7,520,148 | B2 | 4/2009 | Choi |
| 7,536,882 | B2 | 5/2009 | Kim et al. |
| 7,762,007 | B2 | 7/2010 | Guinibert et al. |
| 7,797,971 | B2 | 9/2010 | Kawabata et al. |
| 7,841,220 | B2 | 11/2010 | Lim et al. |
| 2002/0000108 | A1 | 1/2002 | Heyder et al. |
| 2002/0014095 | A1 | 2/2002 | Seagar et al. |
| 2002/0042957 | A1 | 4/2002 | Kim et al. |
| 2002/0166349 | A1 | 11/2002 | Lim et al. |
| 2003/0056302 | A1 | 3/2003 | Broker et al. |
| 2003/0061841 | A1 | 4/2003 | Nakamura et al. |
| 2004/0025544 | A1 | 2/2004 | Kim et al. |
| 2004/0031295 | A1 | 2/2004 | Choi |
| 2004/0035155 | A1 | 2/2004 | Yoon |
| 2004/0123631 | A1 | 7/2004 | Chang |
| 2004/0129035 | A1 | 7/2004 | Chang |
| 2004/0163425 | A1 | 8/2004 | Kim et al. |
| 2004/0163428 | A1 | 8/2004 | Kim et al. |
| 2004/0237603 | A1 | 12/2004 | Kim et al. |
| 2004/0244121 | A1 | 12/2004 | Lim et al. |
| 2004/0244168 | A1 | 12/2004 | Lee |
| 2004/0244438 | A1 | 12/2004 | North |
| 2005/0028564 | A1 | 2/2005 | Lee et al. |
| 2005/0188472 | A1 | 9/2005 | Park et al. |
| 2005/0274159 | A1 | 12/2005 | Jeon et al. |
| 2006/0010612 | A1 | 1/2006 | Kim et al. |
| 2006/0011429 | A1 | 1/2006 | Park et al. |
| 2006/0016228 | A1 | 1/2006 | Chang et al. |
| 2006/0254321 | A1 | 11/2006 | Lim et al. |
| 2007/0125135 | A1 | 6/2007 | Kim et al. |
| 2007/0227200 | A1 | 10/2007 | Kim et al. |

FOREIGN PATENT DOCUMENTS

| | | | | |
|---|---|---|---|---|
| CN | 1332816 | A | | 1/2002 |
| CN | 1511997 | A | | 7/2004 |
| CN | 1515732 | A | | 7/2004 |
| CN | 1550609 | A | | 12/2004 |
| CN | 1614123 | | | 5/2005 |
| DE | 1 095 778 | | | 12/1960 |
| DE | 1 113 439 | | | 9/1961 |
| DE | 1 188 547 | | | 3/1965 |
| DE | 19 12 481 | U | | 3/1965 |
| DE | 24 01 888 | A1 | | 7/1975 |
| DE | 24 54 489 | A1 | | 5/1976 |
| DE | 26 05 589 | | * | 9/1976 |
| DE | 26 33 604 | A1 | | 2/1978 |
| DE | 27 32 684 | | * | 2/1978 |
| DE | 27 32 684 | A1 | | 2/1978 |
| DE | 27 46 989 | A1 | | 4/1978 |
| DE | 31 09 641 | A1 | | 2/1982 |
| DE | 31 34 633 | | * | 6/1982 |
| DE | 31 34 633 | A1 | | 8/1982 |
| DE | 34 37 835 | | * | 5/1985 |
| DE | 34 37 835 | A1 | | 5/1985 |
| DE | 37 13 921 | | | 11/1988 |
| DE | 38 11 583 | A1 | | 10/1989 |
| DE | 39 07 258 | | * | 10/1989 |
| DE | 39 07 258 | A1 | | 10/1989 |
| DE | 39 34 434 | A1 | | 4/1991 |
| DE | 42 39 504 | A1 | | 5/1994 |
| DE | 43 10 594 | A1 | | 10/1994 |
| DE | 4 426 900 | | | 2/1995 |
| DE | 43 30 079 | A1 | | 3/1995 |
| DE | 198 06 884 | | | 8/1999 |
| DE | 199 61 780 | | | 7/2001 |
| EP | 0 124 939 | B1 | | 11/1984 |
| EP | 0 132 805 | A1 | | 2/1985 |
| EP | 0 212 259 | A2 | | 3/1987 |
| EP | 0 272 949 | B1 | | 6/1988 |
| EP | 0 371 926 | A1 | | 6/1990 |
| EP | 0 405 068 | B1 | | 1/1991 |
| EP | 0 465 885 | | | 1/1992 |
| EP | 0 716 177 | B1 | | 6/1996 |
| EP | 0 750 064 | A1 | | 12/1996 |
| EP | 0 869 212 | | | 10/1998 |
| EP | 0 943 720 | | | 9/1999 |
| EP | 0 969 134 | A1 | | 1/2000 |
| EP | 0 725 179 | B1 | | 7/2000 |
| EP | 1 055 765 | A1 | | 11/2000 |
| EP | 1 079 014 | B1 | | 2/2001 |
| EP | 1 094 239 | B1 | | 4/2001 |
| EP | 1 201 810 | | | 5/2002 |
| EP | 1 386 996 | B1 | | 2/2004 |
| EP | 1 433 890 | B1 | | 6/2004 |
| EP | 1 433 891 | | | 6/2004 |
| EP | 1 433 891 | A2 | | 6/2004 |
| EP | 1 455 011 | | | 9/2004 |
| EP | 1 505 191 | A1 | | 2/2005 |
| EP | 1 548 170 | | | 6/2005 |
| EP | 1 605 088 | A2 | | 12/2005 |
| EP | 1 619 286 | | | 1/2006 |
| EP | 1 688 531 | A1 | | 8/2006 |
| FR | 2.230.782 | | * | 12/1974 |
| FR | 2 478 151 | | | 9/1981 |
| FR | 2 511 401 | | | 2/1983 |
| FR | 2 610 017 | | | 7/1988 |
| GB | 646582 | | | 11/1950 |
| GB | 1120431 | | | 7/1968 |
| GB | 1 181 797 | | | 2/1970 |
| GB | 1 270 950 | | | 4/1972 |
| GB | 1 353 283 | | | 5/1974 |
| GB | 2 096 649 | A | | 10/1982 |
| GB | 2 157 326 | A | | 10/1985 |
| GB | 2 189 511 | A | | 10/1987 |
| GB | 2 202 867 | A | | 10/1988 |
| GB | 2 360 296 | | | 9/2001 |
| JP | 39-21844 | U | | 7/1962 |
| JP | 48-64179 | | | 8/1973 |
| JP | 49-135264 | | | 11/1974 |
| JP | 54-028470 | | | 3/1979 |
| JP | 56-116987 | A | | 9/1981 |
| JP | 57-43792 | A | | 3/1982 |
| JP | 59-211496 | A | | 11/1984 |
| JP | 60-190998 | | | 9/1985 |
| JP | 63-95587 | U | | 6/1988 |
| JP | 01-230390 | | | 9/1989 |
| JP | 02-189188 | | | 7/1990 |
| JP | 03-141988 | | | 6/1991 |
| JP | 03-88479 | U | | 9/1991 |
| JP | 04-092697 | A | | 3/1992 |
| JP | 04-210091 | | | 7/1992 |
| JP | 04-220291 | | * | 8/1992 |
| JP | 04-236988 | A | | 8/1992 |
| JP | 04-240488 | A | | 8/1992 |
| JP | 04-325196 | | | 11/1992 |
| JP | 4-371194 | | * | 12/1992 |
| JP | 04-371194 | A | | 12/1992 |
| JP | 05-084388 | A | | 4/1993 |
| JP | 5-084389 | | | 4/1993 |
| JP | 05-220293 | A | | 8/1993 |
| JP | 06-079087 | A | | 3/1994 |
| JP | 09-066185 | | | 3/1997 |
| JP | 09-182368 | | | 7/1997 |
| JP | 09-182370 | A | | 7/1997 |
| JP | 54-134264 | | * | 11/1997 |
| JP | 09-313780 | | | 12/1997 |
| JP | 10-201993 | A | | 8/1998 |
| JP | 10-263265 | | | 10/1998 |
| JP | 11-076680 | A | | 3/1999 |
| JP | 2000-262796 | A | | 9/2000 |
| JP | 2000-334194 | A | | 12/2000 |
| JP | 2002-153695 | A | | 5/2002 |
| JP | 2002-529173 | T | | 9/2002 |
| JP | 2002-346281 | A | | 12/2002 |

| | | | |
|---|---|---|---|
| JP | 2003-079995 | | 3/2003 |
| JP | 2003-230792 | A | 8/2003 |
| JP | 2004-513721 | | 5/2004 |
| JP | 2004-188204 | | 7/2004 |
| JP | 2004-209255 | | 7/2004 |
| JP | 2005-198698 | * | 7/2005 |
| JP | 2006-026408 | | 2/2006 |
| JP | 2006-034755 | | 2/2006 |
| KR | 10-1999-0066050 | A | 8/1999 |
| KR | 10-1999-0079731 | A | 10/1999 |
| KR | 10-2001-0009545 | A | 2/2001 |
| KR | 10-2001-046776 | | 6/2001 |
| KR | 10-2004-0011307 | A | 2/2004 |
| KR | 10-2004-0047223 | A | 6/2004 |
| KR | 10-2004-0058999 | A | 7/2004 |
| KR | 10-2006-0009075 | | 1/2006 |
| KR | 10-2006-00028804 | A | 4/2006 |
| RU | 1615258 | * | 12/1990 |
| SU | 1181112 | A | 9/1986 |
| SU | 1663074 | A1 | 7/1991 |
| SU | 1 703 740 | | 1/1992 |
| WO | WO 98/29595 | A2 | 7/1998 |
| WO | WO 99/35320 | | 7/1999 |
| WO | WO 03/012185 | | 2/2003 |
| WO | WO 03/097918 | A2 | 11/2003 |
| WO | WO 2005/071155 | | 8/2005 |

OTHER PUBLICATIONS

U.S. Final Office Action dated Aug. 14, 2006 issued in U.S. Appl. No. 10/461,451.
U.S. Final Office Action dated Dec. 13, 2006 issued in U.S. Appl. No. 10/461,451.
U.S. Office Action dated Jan. 5, 2007 issued in U.S. Appl. No. 11/475,885.
U.S. Office Action dated Apr. 27, 2007 issued in U.S. Appl. No. 10/461,451.
U.S. Office Action dated Jun. 8, 2007 issued in U.S. Appl. No. 11/470,704.
U.S. Final Office Action dated Jul. 17, 2007 issued in U.S. Appl. No. 11/475,885.
European Search Report dated Aug. 20, 2007 issued in Application No. 07105198.1-2314.
U.S. Office Action dated Nov. 19, 2007 issued in U.S. Appl. No. 10/461,451.
U.S. Office Action dated Nov. 30, 2007 issued in U.S. Appl. No. 11/470,704.
U.S. Office Action dated Apr. 1, 2008 issued in U.S. Appl. No. 11/475,885.
U.S. Final Office Action dated May 15, 2008 issued in U.S. Appl. No. 11/470,704.
U.S. Final Office Action dated Jun. 16, 2008 issued in U.S. Appl. No. 10/461,451.
U.S. Office Action dated Sep. 5, 2008 issued in U.S. Appl. No. 11/165,332.
U.S. Office Action dated Sep. 11, 2008 issued in U.S. Appl. No. 11/470,704.
U.S. Final Office Action dated Feb. 25, 2009 issued in U.S. Appl. No. 11/165,332.
U.S. Office Action dated Feb. 25, 2009 issued in U.S. Appl. No. 12/198,269.
Japanese Office Action dated Mar. 2, 2009 issued in Application No. 2004-000478.
U.S. Office Action dated Sep. 21, 2009 issued in U.S. Appl. No. 12/267,457.
U.S. Final Office Action dated Oct. 14, 2009 issued in U.S. Appl. No. 12/198,269.
U.S. Office Action dated Oct. 15, 2009 issued in U.S. Appl. No. 11/529,759.
U.S. Office Action dated Oct. 28, 2009 issued in U.S. Appl. No. 12/230,031.
Japanese Office Action dated Dec. 18, 2009 issued in Application No. 2004-000478.
Chinese Office Action issued in CN Application No. 200710089087.4 dated Jan. 8, 2010.
U.S. Office Action dated Feb. 2, 2010 issued in U.S. Appl. No. 12/198,269.
European Search Report dated Feb. 3, 2010 issued in Application No. 09178918.0.
U.S. Final Office Action dated Mar. 5, 2010 issued in U.S. Appl. No. 12/267,457.
Chinese Office Action dated Mar. 8, 2010 issued in Application No. 200610142200.6.
U.S. Final Office Action dated Mar. 19, 2010 issued in U.S. Appl. No. 11/529,759.
Notice of Opposition dated May 7, 2010 filed in the European Patent Office for European Patent Application No. 05013603.5 (Publication No. EP 1 619 286 B1).
U.S. Final Office Action dated May 14, 2010 issued in U.S. Appl. No. 12/230,031.
Japanese Office Action issued in JP Application No. 2005-204374 dated Jul. 28, 2010.
Japanese Office Action issued in JP Application No. 2006-235745 dated Aug. 3, 2010.
U.S. Office Action dated Aug. 13, 2010 issued in U.S. Appl. No. 12/639,872.
Notice of Opposition and Opposition Brief filed in EP Application No. 03013411.8 dated Sep. 29, 2010 (Publication No. EP 1 433 890 B1) (Full German Text & English Translation).
U.S. Office Action issued in U.S. Appl. No. 12/797,758 dated Oct. 28, 2010.
European Search Report issued in EP Application No. 10012467 dated Nov. 25, 2010.
U.S. Office Action issued in U.S. Appl. No. 12/639,859 dated Dec. 9, 2010.
U.S. Office Action issued in U.S. Appl. No. 12/940,138 dated Dec. 16, 2010.
U.S. Office Action issued in U.S. Appl. No. 12/639,894 dated Dec. 23, 2010.
U.S. Office Action issued in U.S. Appl. No. 12/985,389 dated Mar. 16, 2011.
U.S. Office Action issued in U.S. Appl. No. 12/797,758 dated Mar. 17, 2011.
European Search Report issued in EP Application No. 10012465 dated Mar. 24, 2011.
European Search Report issued in EP Application No. 10012469 dated Apr. 8, 2011.
European Search Report issued in EP Application No. 10012470 dated Apr. 8, 2011.
U.S. Office Action issued in U.S. Appl. No. 12/940,096 dated Apr. 18, 2011.
U.S. Office Action issued in U.S. Appl. No. 12/639,859 dated Apr. 27, 2011.
European Search Report issued in EP Application No. 10012468 dated May 4, 2011.
U.S. Office Action issued in U.S. Appl. No. 12/940,138 dated May 20, 2011.
U.S. Final Office Action issued in U.S. Appl. No. 12/639,894 dated Aug. 3, 2011.
U.S. Final Office Action issued in U.S. Appl. No. 12/985,389 dated Aug. 8, 2011.
U.S. Final Office Action issued in U.S. Appl. No. 12/940,138 dated Sep. 8, 2011.
Office Action issued in U.S. Appl. No. 13/116,059 dated Nov. 28, 2011.
Office Action issued in U.S. Appl. No. 13/116,096 dated Nov. 29, 2011.
Office Action issued in U.S. Appl. No. 13/116,077 dated Nov. 30, 2011.
Office Action issued in U.S. Appl. No. 13/116,089 dated Nov. 30, 2011.
Office Action issued in U.S. Appl. No. 13/116,159 dated Nov. 30, 2011.
Office Action issued in U.S. Appl. No. 13/116,147 dated Nov. 30, 2011.
Office Action issued in U.S. Appl. No. 13/116,105 dated Dec. 1, 2011.

European Office Action dated Dec. 7, 2011. (Application No. 10 012 465.0-2314).
Office Action issued in U.S. Appl. No. 13/241,366 dated Jan. 31, 2012.
Notice of Allowance issued in U.S. Appl. No. 13/239,439 dated Feb. 9, 2012.
Notice of Allowance issued in U.S. Appl. No. 13/239,448 dated Feb. 10, 2012.
Office Action issued in U.S. Appl. No. 13/241,366 dated Feb. 10, 2012.
European Office Action dated Jul. 14, 2011 (Application No. 03013411.8).
U.S. Office Action issued in U.S. Appl. No. 13/241,348 dated Feb. 23, 2012.
U.S. Office Action issued in U.S. Appl. No. 13/239,424 dated Feb. 29, 2012.
U.S. Office Action issued in U.S. Appl. No. 13/241,411 dated Mar. 6, 2012.
U.S. Notice of Allowance issued in U.S. Appl. No. 13/239,445 dated Mar. 12, 2012.
U.S. Office Action issued in U.S. Appl. No. 13/239,427 dated Mar. 21, 2012.
U.S. Office Action issued in U.S. Appl. No. 13/241,337 dated Mar. 22, 2012.
U.S. Office Action issued in U.S. Appl. No. 13/239,416 dated Apr. 12, 2012.
U.S. Office Action issued in U.S. Appl. No. 13/116,089 dated Apr. 13, 2012.
U.S. Office Action issued in U.S. Appl. No. 13/116,077 dated Apr. 16, 2012.
U.S. Office Action issued in U.S. Appl. No. 13/116,096 dated Apr. 16, 2012.
U.S. Office Action issued in U.S. Appl. No. 13/116,159 dated Apr. 18, 2012.
U.S. Office Action issued in U.S. Appl. No. 13/239,430 dated May 4, 2012.
U.S. Office Action issued in U.S. Appl. No. 13/239,422 dated May 9, 2012.
U.S. Office Action issued in U.S. Appl. No. 13/241,348 dated Jun. 25, 2012.
U.S. Office Action issued in U.S. Appl. No. 13/241,366 dated Jun. 26, 2012.
U.S. Office Action issued in U.S. Appl. No. 13/241,396 dated Jun. 27, 2012.
Notice of Allowance issued in U.S. Appl. No. 13/239,427 dated Jun. 27, 2012.
Supplemental Notice of Allowance issued in U.S. Appl. No. 13/239,424 dated Jul. 10, 2012.
U.S. Office Action issued in U.S. Appl. No. 13/239,410 dated Jul. 19, 2012.
U.S. Notice of Allowance issued in U.S. Appl. No. 13/239,422 dated Aug. 15, 2012.
U.S. Notice of Allowance issued in U.S. Appl. No. 13/239,430 dated Aug. 17, 2012.
U.S. Final Office Action issued in U.S. Appl. No. 13/241,337 dated Sep. 18, 2012.
U.S. Office Action issued in U.S. Appl. No. 13/116,096 dated Sep. 21, 2012.
U.S. Notice of Allowance issued in U.S. Appl. No. 13/116,159 dated Oct. 9, 2012.
U.S. Notice of Allowance issued in U.S. Appl. No. 13/116,077 dated Oct. 15, 2012.
U.S. Notice of Allowance issued in U.S. Appl. No. 13/239,410 dated Oct. 26, 2012.
European Patent Office 0 132 805 Feb. 1985.*

* cited by examiner

DRUM TYPE WASHING MACHINE

Matter enclosed in heavy brackets [ ] appears in the original patent but forms no part of this reissue specification; matter printed in italics indicates the additions made by reissue.

*More than one reissue application has been filed for the reissue of U.S. Pat. No. 7,536,882. The reissue applications are application Ser. Nos. 13/116,059, 13/116,077, 13/116,089, 13/116,096, 13/116,105, 13/116,114 (the present application), 13/116,147, and 13/116,159, all of which are divisional reissues of U.S. Pat. No. 7,536,882.*

This application claims the benefit of the Korean Patent Application No. 10-2006-0028358, filed on Mar. 29, 2006, and Korean Patent Application No. 10-2006-0033255, filed on Apr. 12, 2006, which are hereby incorporated by reference for all purposes as if fully set forth herein.

BACKGROUND OF THE INVENTION

1. Field of the Invention

The present invention relates to a washing machine, and more particularly, to a drum type washing machine. Although the present invention is suitable for a wide scope of applications, it is particularly suitable for facilitating laundry to be loaded and unloaded from the washing machine with a maximum capacity within a predetermined volume.

2. Discussion of the Related Art

Generally, a drum type washing machine according to a related art has the following configuration.

FIG. 1 is a cross-sectional diagram of a drum type washing machine according to the related art, and FIG. 2 is a cross-sectional diagram according to a cutting line II-II shown in FIG. 1.

Referring to FIG. 1 and FIG. 2, a drum type washing machine according to the related art consists of a cabinet 1 having a base 1a and a door 1b, a tub 2 provided within the cabinet 1 to be fixed thereto, a drum 3 rotatably provided within the tub 2 to rotate laundry m and water by a lift 3a, a motor 4 rotating the drum 3, and a spring 5, damper 6, and balancer 7 attenuating vibration transferred to the tub 2.

The drum 3 is provided with a multitude of holes 3b to enable water stored in the tub 2 to be introduced into the drum 3. The lift 3a is provided on an inner surface of the drum 3. The lift 3a is rotated together with the drum 3 to lift the laundry m loaded within the drum 3 together with the water.

The tub 2 is provided to be spaced apart from inner lateral sides of the cabinet 1. Both sides of an upper end of the tub 2 are hung within the cabinet 1 via springs 5. The damper 6 is hinged between the tub 2 and the base 1a to be supported over the base 1a. And, the springs 5 and dampers 6 attenuate the vibration carried to the cabinet 1 from the tub 2.

The door 1b of the cabinet 1 is rotatably provided to a front side 1d of the cabinet 1 to enable the laundry m to be loaded. Front sides 2d and 3d of the tub 2 and the drum 3 are provided with openings 2c and 3c to communicate with a bole (not shown in the drawings) opened by the door 1b, respectively.

A gasket 8 is provided between the front side 1d of the cabinet 1 having the door 1b assembled thereto and the front side 2d of the tub 2 to prevent leakage of the water. In particular, the gasket 8 seals the space between the inner lateral side of the cabinet 1 and the front side 2d of the tub 2.

And, the motor 4 is provided to a backside of the tub 2 to rotate the drum 3 provided within the tub 2.

However, the related art drum type washing machine has the following problems or disadvantages.

First of all, if vibration is generated from an inside of the drum 3 of the related art drum type washing machine due to the imbalance in washing or dewatering, both of the drum 3 and the tub 2 are shaken as one body. And, the springs and dampers 5 and 6 are configured to attenuate the vibration.

Since the tub 2 vibrates, the outer circumference of the tub 2 and the cabinet 1 should be sufficiently spaced apart from each other with a gap ('a' in FIG. 1 or 'b' in FIG. 2) to prevent the cabinet 1 and the tub 2 from colliding with each other. This restricts the capacity or volume of the tub 2 within the cabinet 1 having a fixed size.

Secondly, since the door 1b for loading and unloading the laundry and the openings 2c and 3c of the tub and drum are provided to face the front side of the washing machine, a user has to bend or sit down to load the laundry in the washing machine. This causes inconvenience to the user in using the washing machine.

SUMMARY

Accordingly, the present invention is directed to a drum type washing machine that substantially obviates one or more of the problems due to limitations and disadvantages of the related art.

An advantage of the present invention is to provide a drum type washing machine, by which vibration may be efficiently attenuated in a manner of providing a maximum capacity within a cabinet of fixed size.

Another advantage of the present invention is to provide a drum type washing machine, by which a user does not have to bend over or sit down to load laundry in the washing machine.

Additional advantages features of the invention will be set forth in the description which follows, and in part will be apparent from the description or may be learned from practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, a drum type washing machine according to the present invention includes a cabinet forming an exterior of the drum type washing machine, a tub fixed within the cabinet, the tub having a laundry loading entrance at an outer circumference of the tub, a drum rotatably provided within the tub, the drum having an opening on a lateral side of the drum to communicate with the laundry loading entrance of the tub, a motor assembly provided next to one side of the drum to rotate the drum, and a suspension assembly provided to support a weight of the drum and attenuate vibration of the drum.

It is to be understood that both the foregoing general description and the following detailed description are exemplary and explanatory and should not be construed as limiting the scope of the claims.

BRIEF DESCRIPTION OF THE DRAWINGS

The accompanying drawings, which are included to provide a further understanding of the invention and are incorporated in and constitute a part of this specification illustrate embodiments of the invention and together with the description serve to explain the principles of the invention. In the drawings.

DETAILED DESCRIPTION

Reference will now be made in detail to an embodiment of the present invention, examples of which are illustrated in the accompanying drawings.

Figure 1:
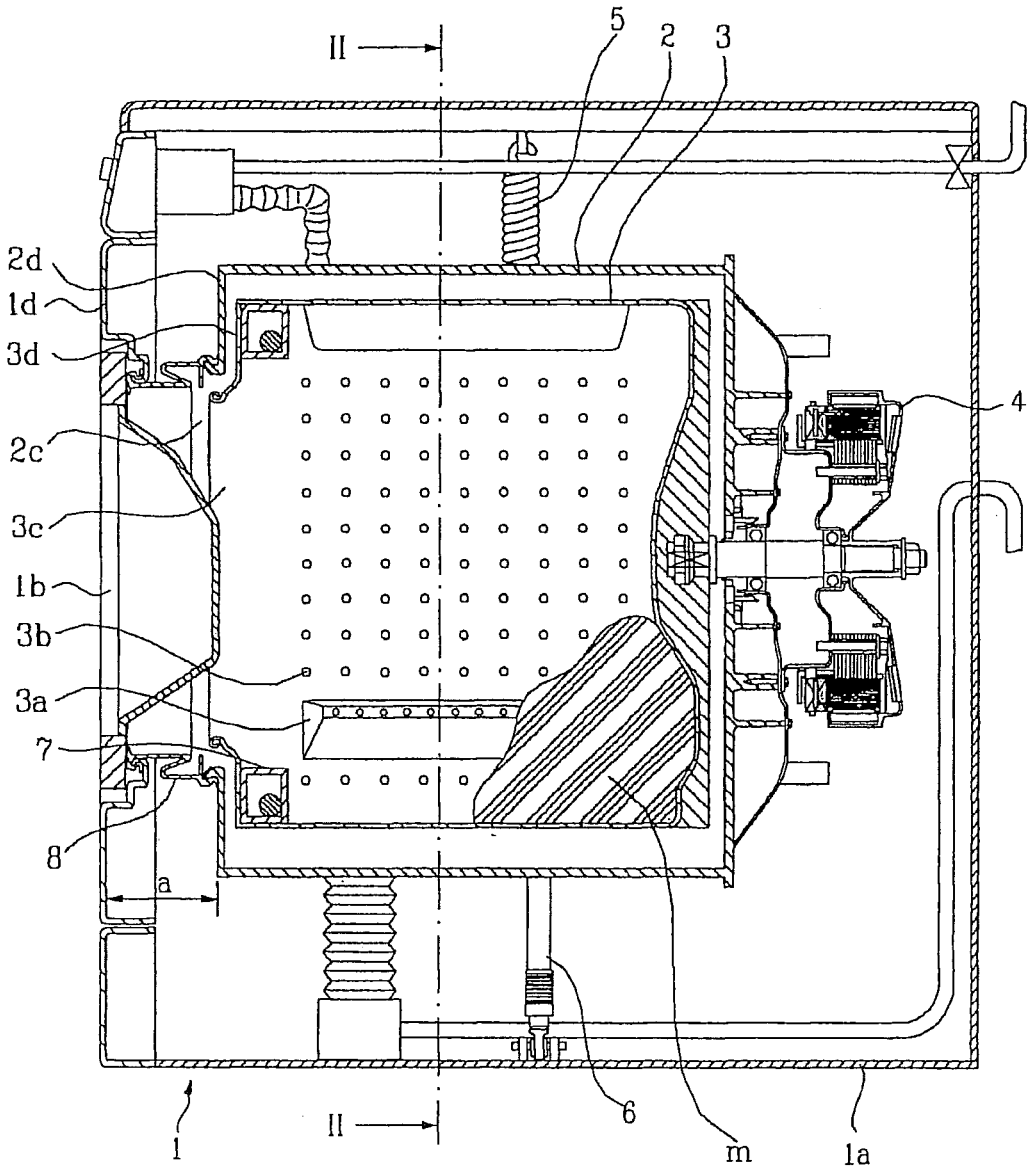
FIG. 1 Related Art
FIG. 1 is a cross-sectional diagram of a drum type washing machine according to a related art.
Figure 2:
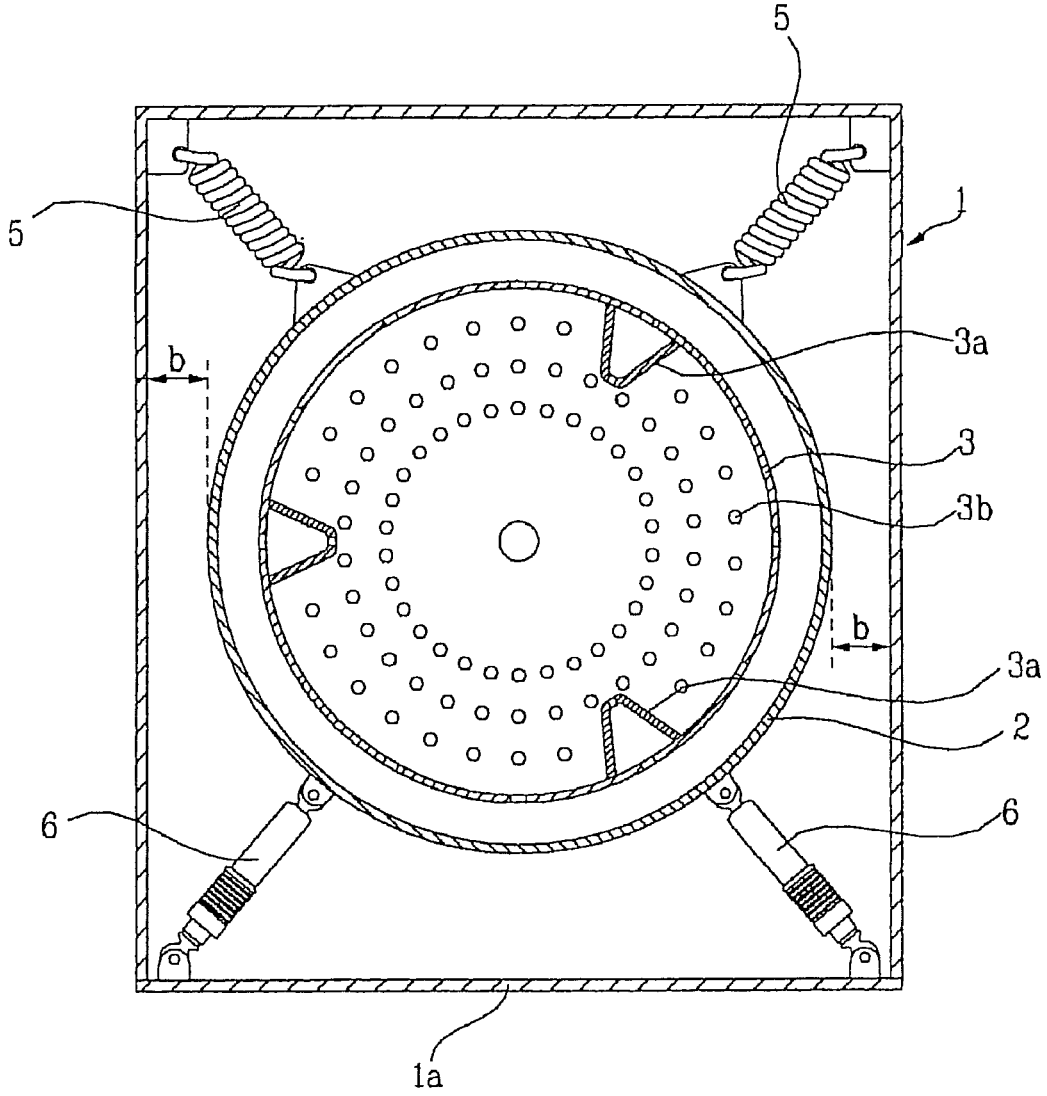
FIG. 2 Related Art
FIG. 2 is a cross-sectional diagram according to a cutting line II-II shown in FIG. 1.
Figure 3:
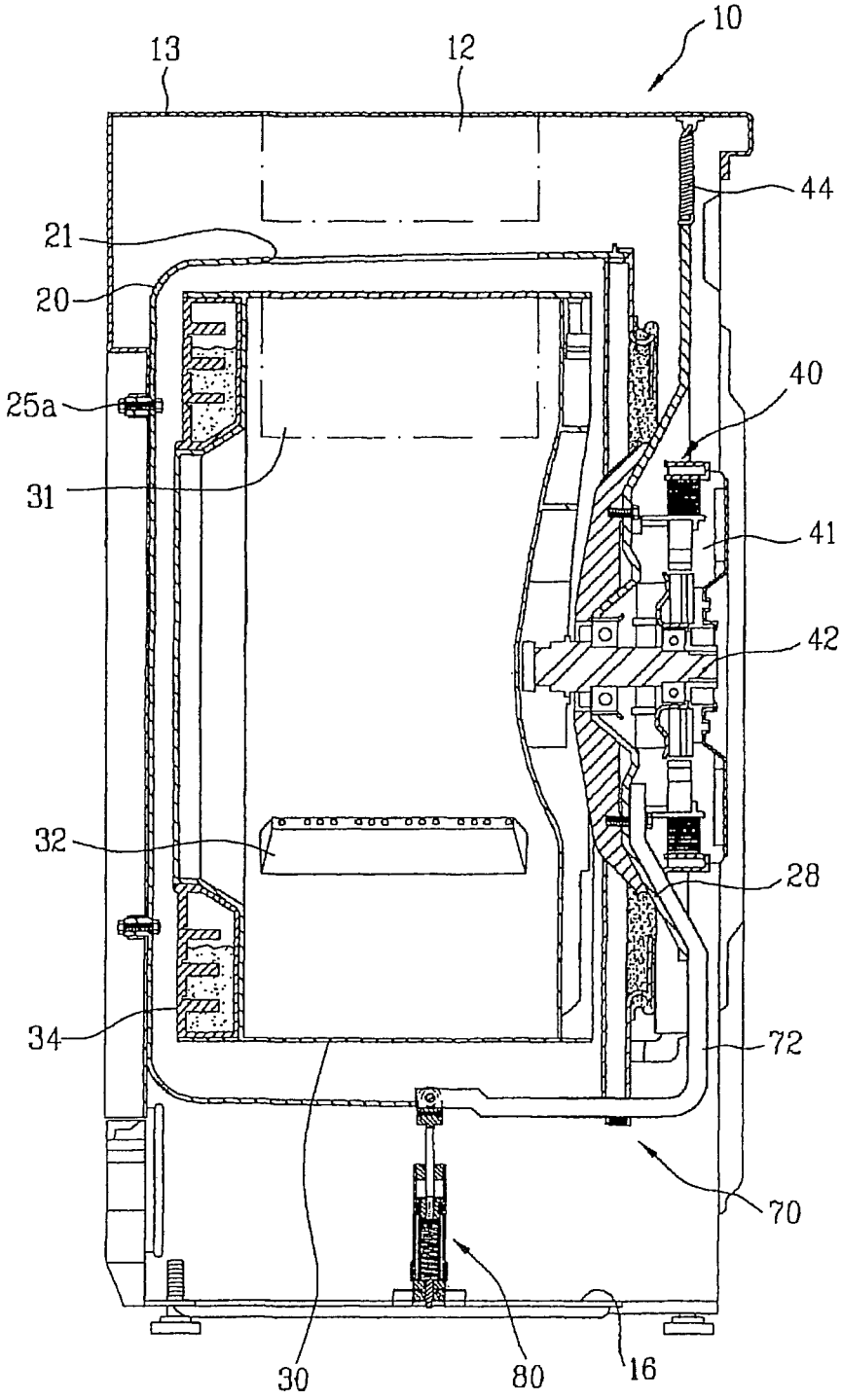
FIG. 3 is a cross-sectional diagram of a drum type washing machine according to one embodiment of the present invention.

FIG. 3 is a cross-sectional diagram of a drum type washing machine according to one embodiment of the present invention.

Referring to FIG. 3, a drum type washing machine according to one embodiment of the present invention includes a cabinet 10 forming an exterior of the washing machine, a tube 20 fixed within the cabinet 10 to store water therein, a drum 30 rotatably provided within the tub 20, a motor assembly 40 providing a rotational force to the drum 30, and a suspension assembly 70 supporting a weight of the drum 30 and attenuating vibration of the drum 30.

In particular, the cabinet 10 forms the exterior of the drum type washing machine and includes a top cover 13 forming an upper side and a base 16.

Unlike the related art tub, the tub 20 of the present embodiment is fixed within the cabinet 10. That is, the tub 20 is directly assembled to an inner front side of the cabinet 10 of the washing machine, for example, via bolts. It should be appreciated, however, that the tub 20 may be fixed within the cabinet 10 in various ways.

A laundry loading entrance 21 is provided on an outer circumference of the tub 20 instead of being provided on the front side of the tub 20. Preferably, the laundry loading entrance 21 is provided to a position facing an upper side from a lateral side of the outer circumference to facilitate a user to load and unload the laundry. Alternatively, the laundry loading entrance 21 may be provided at another position of the outer circumference of the tub 20.

Optionally, a door 12 for loading the laundry may be provided to a position of the cabinet 10 to oppose the laundry loading entrance 21 of the tub 20.

A door assembly 31 may be provided to the drum 30 to communicate with the laundry loading entrance 21. Preferably, the laundry loading entrance 21 and the door assembly 31 are configured to be opened or closed if necessary.

Whenever the drum 30 of the drum type washing machine according to the present embodiment invention stops, it may always stop at a position where the door assembly 31 of the drum 30 and the laundry loading entrance 21 of the tub 20 may communicate with each other. Hence, a user is able to load the laundry in the drum 30 without bending over uncomfortably. And, the user is also able to look down on an inside of the drum 30, thereby enhancing the convenience in using the drum type washing machine.

The drum 30 is rotatably provided within the tub 20. The drum 30 is installed to be spaced apart from the tub 20 with a prescribed gap in-between to prevent a collision with the tub 20 due to vibration. And, at least one lift 32 may be provided to an inner circumference of the drum 30 to lift up the laundry.

The motor assembly 40 is provided on one side of the drum 30 to rotate the drum 30.

The motor assembly 40 includes a motor 41 generating a rotational force, a rotational shaft 42 transferring the rotational force of the motor 41 to the drum 30, and a bearing housing 28 rotatably supporting the rotational shaft 42.

Preferably, the motor assembly 40 is provided on one side of the drum 30 instead of being provided on both sides of the drum 30.

In particular, the rotational shaft 42 for rotating the drum 30 is provided on one side of the drum 30 only to maximize a volume within the drum 30.

The suspension assembly 70 is provided to support the weight of the drum 30 and attenuate the vibration of the drum 30.

Preferably, the suspension assembly 70 is configured to support the drum 30 by supporting the bearing housing 28.

As the drum 30 vibrates, so does the motor assembly 40. So, the suspension assembly 70 supports the bearing housing 28, thereby supporting the weight of the drum 30 and attenuating the vibration.

The above-configured suspension assembly 70 may include a damper bracket 72 extending from the bearing housing 28 and an attenuating part provided between the damper bracket 72 and the cabinet 10 to support the damper bracket 72 and attenuate the vibration simultaneously.

In the present embodiment, the attenuating part may include a damper 80 having one end connected to the damper bracket 72 and the other end connected to the base 16.

The damper bracket 72 may be configured to extend to each lower side of the outer circumference of the tub 20 from the bearing housing 28.

FIG. 3 shows the cross-section of the drum type washing machine according to one embodiment of the present invention.

And, the damper 80 of the drum type washing machine according to one embodiment of the present invention is preferably provided at a planar weight center between the entire elements (e.g., the drum 30, the motor assembly 40 for driving the drum 30, the damper bracket 72 assembled to the motor assembly 40, etc.) supported by the damper 80.

The above-configured damper 80 supports the weight of the drum 30, the weight of the motor assembly 40 for the rotation of the drum 30, and the like and plays a role in attenuating the vibration in a vertical direction. In the following description, the damper 80 attenuating the vertical vibration of the drum 30 is called a main damper 80.

And, the damper bracket 72 assembled to the main damper 80 to be supported by the main damper 80 shall be called a main damper bracket 72 in the following description.

Figure 6:
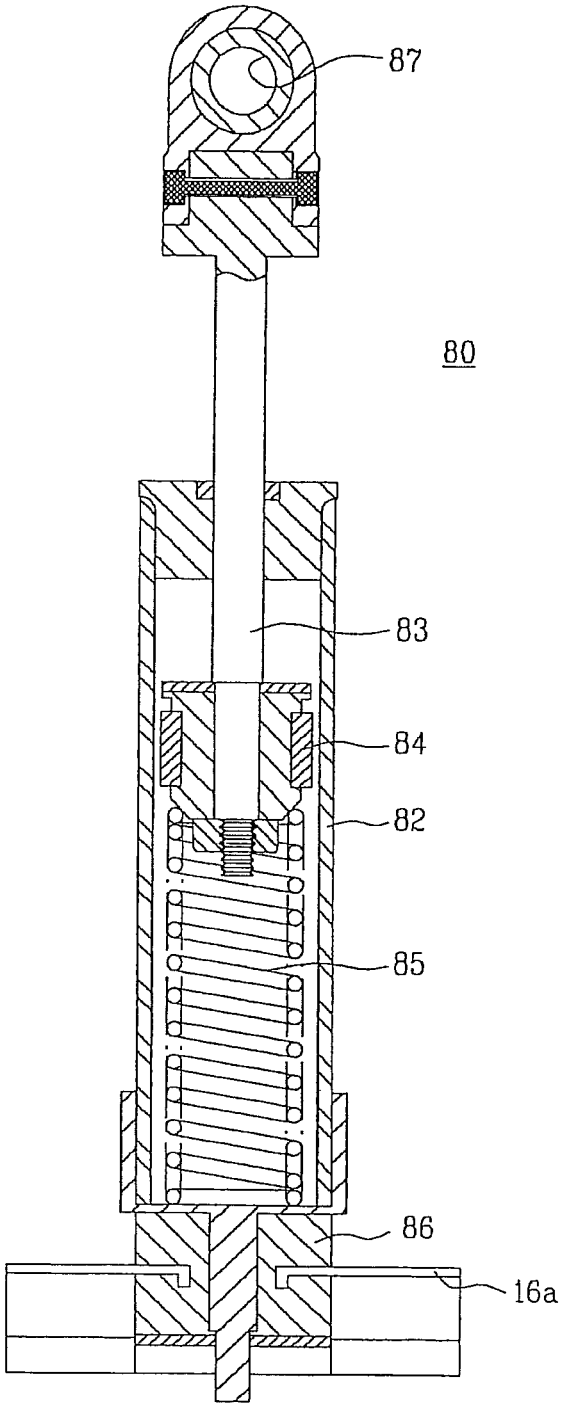
FIG. 6 is a cross-sectional diagram of a main damper shown in FIG. 5.

FIG. 6 is a cross-sectional diagram of the main damper 80.

Referring to FIG. 6, the main damper 80 preferably includes a cylinder 82, a piston 83 reciprocating within the cylinder 82 according to vibration and motion of the drum 30, and a spring 85 elastically supporting the piston 83.

In this case, since the main damper 80 is provided between the main damper bracket 72 and the base 16 to support the weight of the drum 30 upwardly, a compressive weight is normally applied to the main damper 80.

Therefore, it is preferable that the spring 85 is configured to generate an elastic force when the piston 83 enters the cylinder 82.

A frictional member 84 is provided to the piston 82 to come into contact with an inner circumference of the cylinder 82. When the drum 30 vibrates, the frictional member 84 may be configured to attenuate the vibration by making a motion of friction with the inner circumference of the cylinder 82 according to a motion of the piston 83.

In particular, the weight applied to the main damper 80 is elastically supported by the spring 85 and the vibration transferred from the main damper 80 is attenuated by the frictional member 84.

Preferably, one end of the main damper 80 joined to the main damper bracket 72 includes a hinge joint 87, while the other end of the main damper 80 joined to the base 16 is configured to be fixed to the base 16 by an elastic material based rubber bushing 86.

Since the main damper 80 is joined to the main damper bracket 72 by the hinge joint 87, it may have a relative degree of freedom against a motion of the drum 30. So, it is able to prevent the vibration or motion of the drum 30 from being directly carried to the cabinet 10.

Both of the weight of the drum 30 and the weight of the motor assembly 40 for the rotation of the drum 30 are directly applied to the base 16 to which the main damper 80 is joined. To reinforce the base 16, a reinforcing part for rigidity reinforcement may be provided to the portion of the base to which the main damper 80 is joined.

The reinforcing part may be provided by the curved portion ('16a' in FIG. 5) of the base 16 to which the main damper 80 is joined. Alternatively, the reinforcing part may include a separate bracket ('116' in FIG. 9).

Referring back to FIG. 3, to prevent the drum 30 from inclining to one side, an elastic member 44 may be further provided to elastically support the backside of the drum 30. One end of the elastic member 44 is connected to an inner surface of the top cover 13 of the cabinet 10 and the other end of the elastic member 44 is connected to an upper side of the motor assembly 40.

In particular, the elastic member 44 may include a spring. One end of the elastic member 44 is hung on the inner surface of the top cover 13 and the other end of the elastic member 44 is hooked on an upper end of the bearing housing 28. Thus, the backside of the drum 30 is elastically hung on the top cover 13, whereby the drum 30 is prevented from inclining to one side.

A user loads laundry into the drum 30 via the laundry loading entrance 21, which is provided on the lateral side of the outer circumference of the tub 20, and the door assembly 31, which is provided on the lateral side of the outer circumference of the drum 30, and then executes the corresponding washing.

Vibration is generated from the drum 30 in the course of washing and then attenuated by the main damper 80 through the main damper bracket 72. Moreover, the front side of the tub 20 is directly assembled to the front inside of the cabinet 10 to be fixed thereto. So, if vibration or shock is delivered to the tub 20 assembled in one body to the cabinet 10, the weight of the cabinet 10 itself being added to raise the rigidity of the tub 20 rather than the tub 20 itself is shaken by the vibration or shock. Hence, it is able to enhance the overall vibration characteristics of the drum type washing machine.

Another embodiment of the present invention is explained as follows.

In the aforesaid embodiment of the present invention, the suspension assembly 70 supporting the drum 30 includes a pair of the main dampers 80. Yet, in the present embodiment, a suspension assembly 70 may further include a sub-damper attenuating horizontal vibration of a drum 30.

A drum type washing machine according to another embodiment of the present invention is shown in FIGS. 4 to 7.

In describing a drum type washing machine according to another embodiment of the present invention, the same names and reference numbers shall be used for the same parts of the former embodiment.

First of all, a drum type washing machine according to another embodiment of the present invention includes a cabinet 10 forming an exterior of the drum type washing machine, a tub 20 provided within the cabinet 10 to be directly assembled thereto, a drum 30 rotatably provided within the tub 20, a motor assembly 40 provided in rear of the tub 20 to include a motor 41 rotating me drum 30, a bearing housing 28 configuring a backside of the tub 20 to support the rotating shaft 42 of the motor 41, a shock absorbing means 50 provided between the bearing housing 28 and the tub 20 for sealing an internal space of the tub 20 and for absorbing vibration or shock transferred to the tub 20 from the motor 40, and a suspension assembly 60 supporting the drum to attenuate the vibration or shock transferred to the bearing housing 28.

A door 12 is provided on a lateral outer circumference of the cabinet 10 instead of being provided on a front side of the cabinet 10. And, a base 16 defines a bottom side of the cabinet 10.

Figure 4:
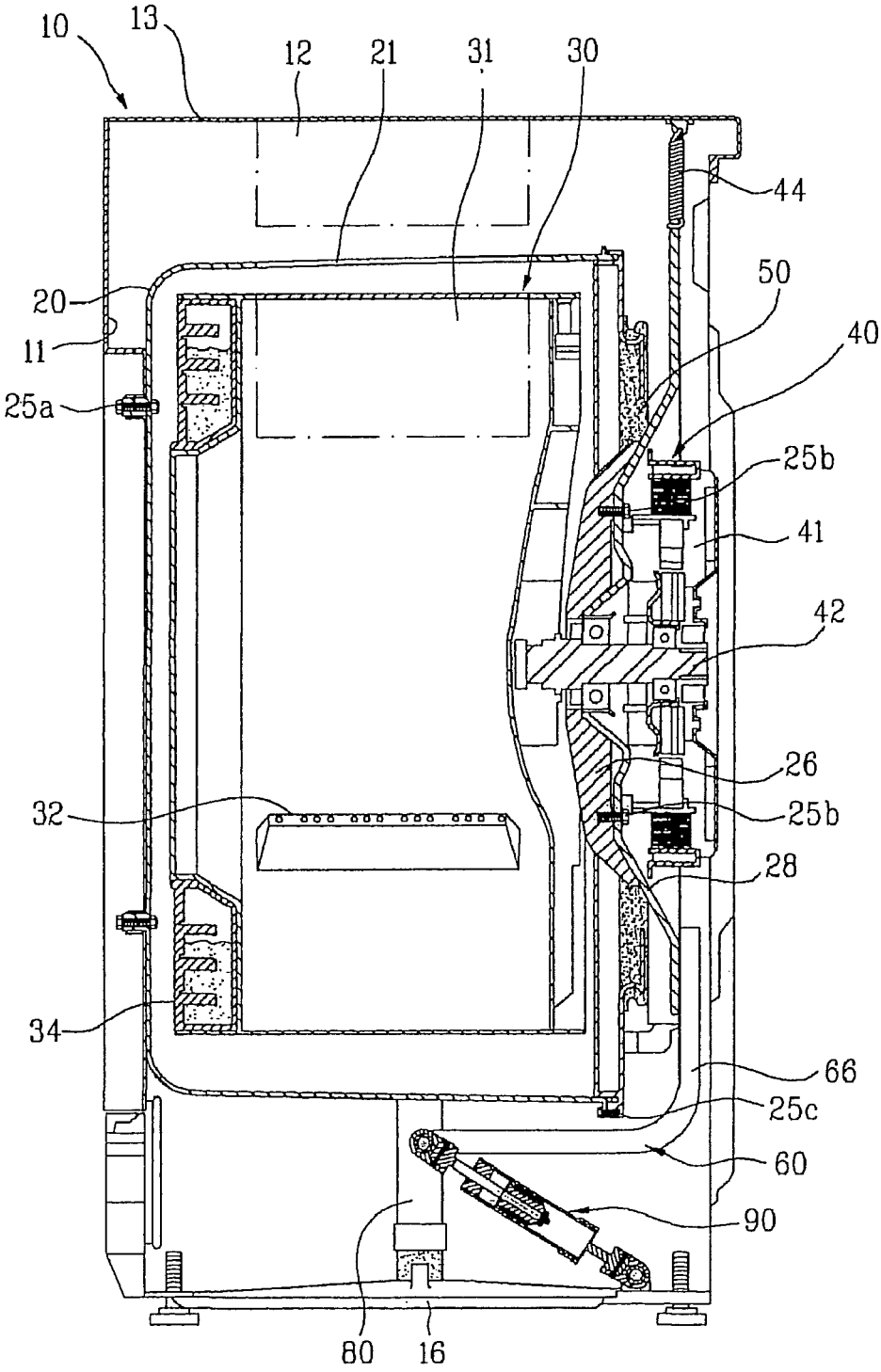
FIG. 4 is a cross-sectional diagram of a drum type washing machine according to another embodiment of the present invention.

The tub 20, as shown in FIG. 4, includes a tub body 22 directly assembled to an inside of a front side 11 of the cabinet 10, the tub body 22 having a laundry loading entrance 21 at a lateral outer circumference to communicate with the door 12 of the cabinet 10, a tub cover 24 assembled to a backside of the tub body 22 to enclose the drum 30, the tub cover 24 having an opening 23 at its center, a tub bracket 26 closing the opening 23 of the tub cover 24, and the bearing housing 28 assembled to a backside of the tub bracket 26 to configure the motor assembly rotating the drum, the bearing housing 28 configured to support the relating shaft 42.

Figure 5:
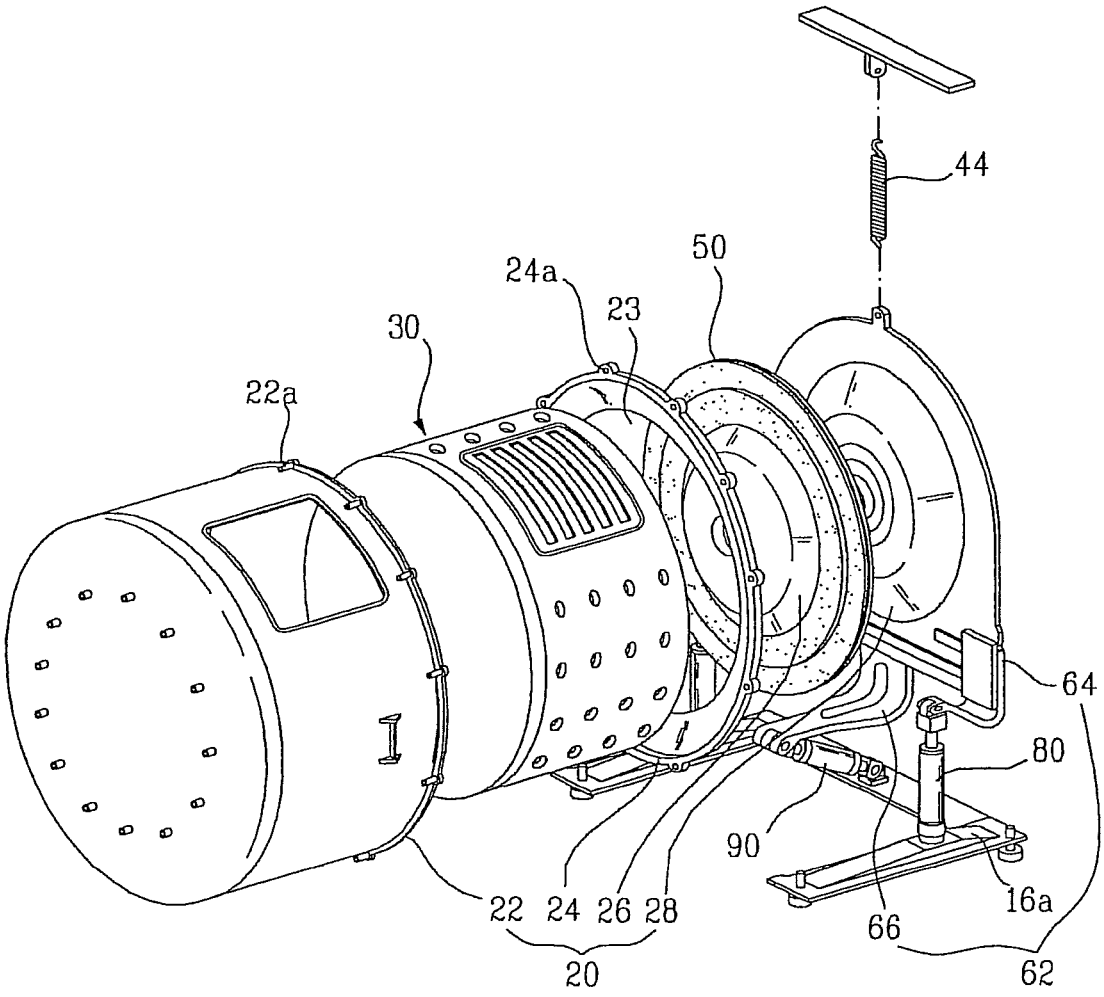
FIG. 5 is an exploded perspective diagram of a tub, a drum and a suspension assembly of a drum type washing machine according to another embodiment of the present invention.

The tub body 22, as shown in FIG. 4 and FIG. 5, is fixed to the cabinet 10 by being locked to the inside of the front side of the cabinet 10 by screws 25a. The tub cover 24 is assembled by accommodating the drum 30 therein. In particular, the tub cover 24 is assembled by being locked to the locking holes 22a and 24a on the outer circumferences of the tub body 22 and the tub cover 24 by screws 25c. The opening 23 of the tub cover 24 is sealed by the tub bracket 26 and the shock absorbing means 50. The bearing housing 28 is assembled to the backside of the tub bracket 26 by screws 25b. In this case, the bearing housing 28 is provided with bearing (not shown in the drawings) to enable the rotational shaft 42 to be smoothly rotated and the rotational shaft 42 is supported by the bearing.

The shock absorbing means 50 is provided to absorb vibration or shock generated from the drum 30 and the motor 40 in performing washing or dewatering. The shock absorbing means 50 is formed of an elastic material that contracts or expands against the vibration or shock. And, the shock absorbing means 50 may include a backside gasket provided along an outer circumference of the tub bracket 26 to seal the opening 23. In the present embodiment, the shock absorbing means 50 is implemented by the backside gasket that simultaneously achieves both a sealing function and a shock absorbing function between the tub cover 24 and the tub bracket 26.

Alternatively, the shock absorbing means 50 may be individually configured according to each of the functions. In particular, a sealing member (not shown in the drawings) having the sealing function is inserted between the tub cover 24 and the tub bracket 26 and the shock absorbing means 50 is provided between the bearing housing 28 and the tub bracket 26.

Hence, even if the vibration or shock is generated from the drum 30 or the motor assembly 40 joined to the drum 30, since the shock absorbing means 50 is provided between the drum 30 and the tub 20, the vibration or shock is delivered to the tub 20 after having been buffered via the shock absorbing means instead of being directly carried to the tub 20. The vibration or shock delivered to the tub 20 is then attenuated or reduced by each rigidity and weight of the tub 20 and the cabinet 10.

The motor 40 is assembled to the backside of the bearing housing 28. The rotational shaft 42 of the motor 40 passes through both of the bearing housing 28 and the tub bracket 26 to be fixed to the backside of the drum 30.

The drum 30 is rotated by the rotating shaft 42 of the motor 40. And, at least one lilt 32 is provided to an inner surface of the drum 30 to lift a laundry. And, a liquid balancer 34 is provided to a front side of the drum 30. In this case, the liquid balancer 34 plays a role in balancing the drum 30 to suppress the vibration of the drum 30.

The suspension assembly 60 is provided to support the weight of the drum 30 and attenuate the vibration of the drum 30.

In the present embodiment, the suspension assembly 60 may include a damper bracket 62 extending from the bearing housing 28 and an attenuating part supporting the damper bracket 66 to support the drum 30.

And, the attenuating pan may include a pair of main dampers 80 supporting the weight of the drum 30 to attenuate the vertical vibration of the drum 30 and a sub-damper 90 attenuating the horizontal vibration of the drum 30.

Moreover, the damper bracket 62 may include a pair of main damper brackets 64 joined to a pair of the main dampers 80, respectively and a sub-damper bracket 66 joined to the sub-damper 90.

In particular, the main damper bracket 64 joined to the main damper 80 is configured to have one end to be fixed to one of both lower corner of the bearing housing 28 and the other end bent toward a front side of the tub 20. And, the main damper 80 is joined to the corresponding portion bent toward the front side of the tub 20.

Preferably, the main damper 80 is installed vertical to the base 16. This is because the main damper 80 supports the vertical weights of the drum 30, bearing housing 28, and motor 40 and also plays a role in attenuating the vertical vibration.

In particular, a pair of the main damper brackets 64 are provided to both of the lower corners of the bearing housing 28 toward the front side of the tub 20 and a pair of the main dampers 80 are joined to a pair of the main damper brackets 64, respectively.

One end of the sub-damper bracket 66 joined to the sub-damper 90 is fixed to a center of a lower side of the bearing housing 28, while the other end extends to a prescribed length toward the front side of the tub 20. And, the sub-damper 90 is joined to the portion of the sub-damper bracket 66 extending toward the front side of the tub 20.

In this case, the sub-damper 90 is configured to attenuate the horizontal vibration of the drum 30. In particular, the sub-damper 90 is preferably configured to incline a front to rear direction of the drum 30 to attenuate the front to rear direction vibration generated from over-vibration of the drum 30.

Alternatively, the sub-damper 90 may be provided in a right to left direction to attenuate the right to left vibration.

Since the configuration of the main damper 80 is identical to that of the aforesaid main damper 80 of the former embodiment of the present invention, details of the main damper 80 are omitted in the following description.

Figure 7:
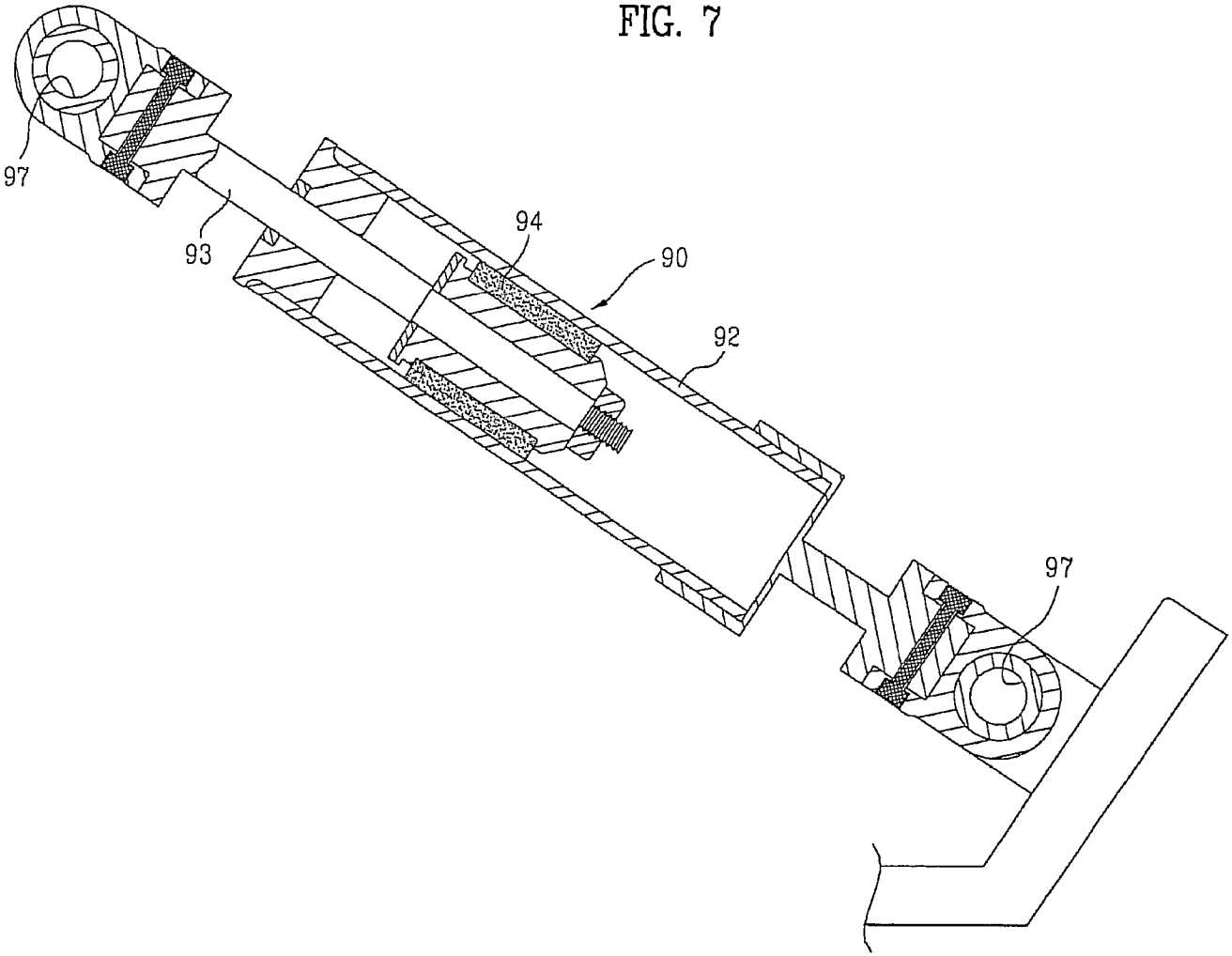
FIG. 7 is a cross-sectional diagram of a sub-damper shown in FIG. 5.

FIG. 7 is a cross-sectional diagram of the sub-damper 90 according to an embodiment of the present invention.

Referring to FIG. 7, the sub-damper 90 includes a cylinder 92 having a hollow configuration, a piston 93 reciprocating within the cylinder 92 according to a motion of the drum 30, and a frictional member 94 provided to the piston 93 to attenuate vibration energy by frictional movement against an inner surface of the cylinder 92.

Preferably, the sub-damper 90 is provided between the sub-damper bracket 66 and the base 16 configuring the bottom side of the cabinet 10. More preferably, both ends of the sub-damper 90 are joined by hinges 97 thereto.

Therefore, if the drum 30 vibrates bock and forth, the sub-damper 90 contracts and expands in a direction of the vibration of the drum 30 to attenuate the corresponding vibration.

Similar to the former embodiment, the present embodiment may further include a reinforcing part provided a portion for joining the main damper 80 or the sub-damper 90 to the base 16 of the cabinet 10 to reinforce rigidity.

Figure 9:
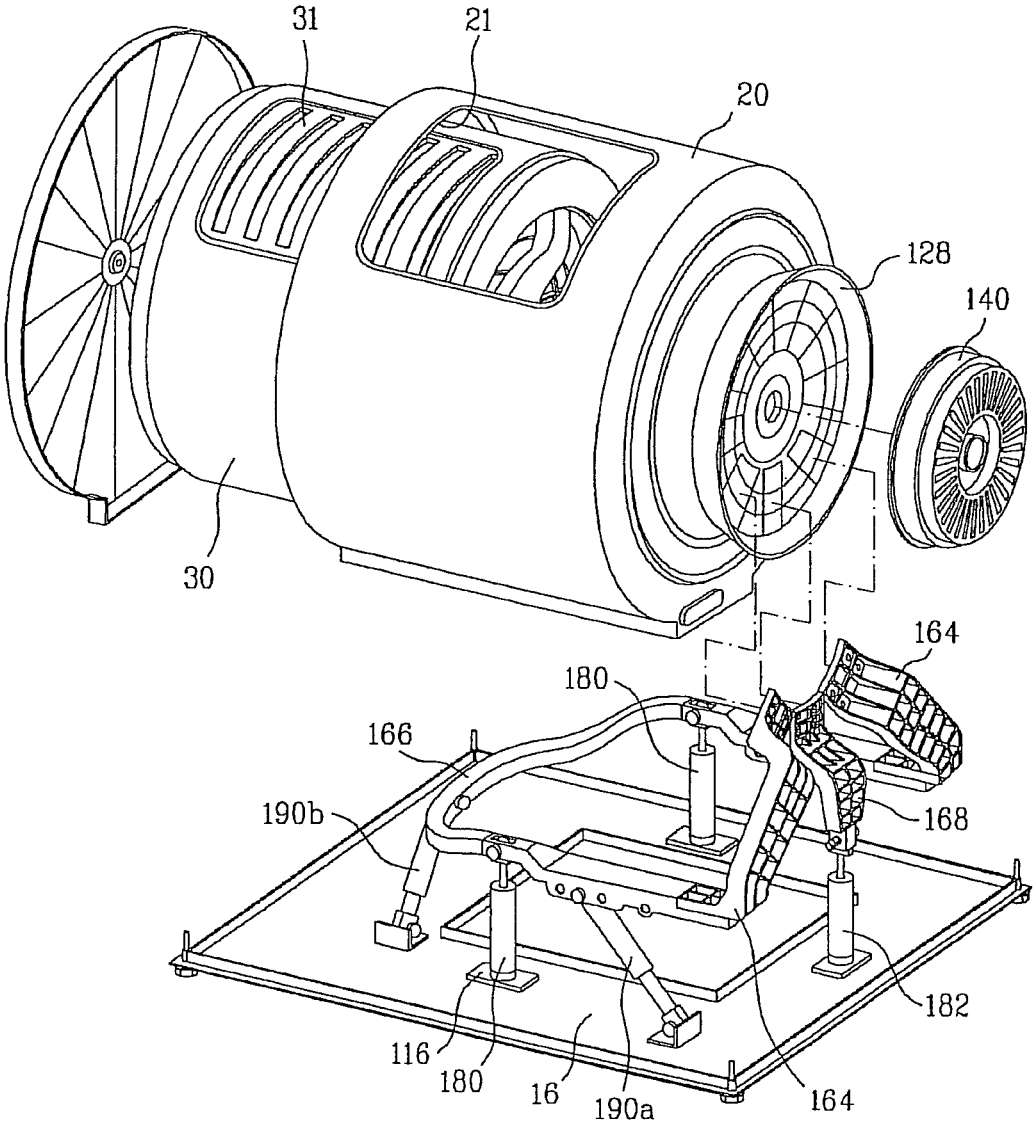
FIG. 9 is an exploded perspective diagram of a tub, a drum and a suspension assembly of a drum type washing machine according to a further embodiment of the present invention.

In this case, the reinforcing part may include a curved part 16a provided to the portion for joining the main damper 80 or the sub-damper 90 to the cabinet 10 or a separate bracket ('116' in FIG. 9).

Referring to FIG. 4, an elastic member 44, such as a coil spring, a string made of rubber and the like, may be provided to an inner surface of the top cover 13 forming a topside of the cabinet 10 to elastically hang the bearing housing 28. In particular, the elastic member 44 elastically supports a rear portion of the drum 30 to prevent the drum 30 from inclining to one side.

Therefore, the vibration or shock generated from the drum 30 is transferred to the rotational shaft 42 of the motor connected to the drum 30 and the bearing housing 28 supporting the rotational shaft 42. In this case, the transferred vibration or shock is primarily absorbed by the contraction or expansion of the shock absorbing means 50 and the rest of the vibration or shock is then delivered to the main dampers 90 and the sub-damper via the main damper brackets 64 and the sub-damper bracket 66, respectively. So, the vibration or shock generated from the drum 30 may be reduced in a manner that the main dampers 80 attenuate the vertical vibration of the vibration delivered to the main dampers 80 and the sub-damper 90 while the sub-damper 90 attenuates the horizontal vibration of the vibration delivered to the main dampers 80 and the sub-damper 90.

Hence, the horizontal vibration generated from the drum 30 is attenuated as well as the vertical vibration, whereby the drum 30 may be supported more stably.

A drum type washing machine according to a further embodiment of the present invention is explained as follows.

Figure 8:
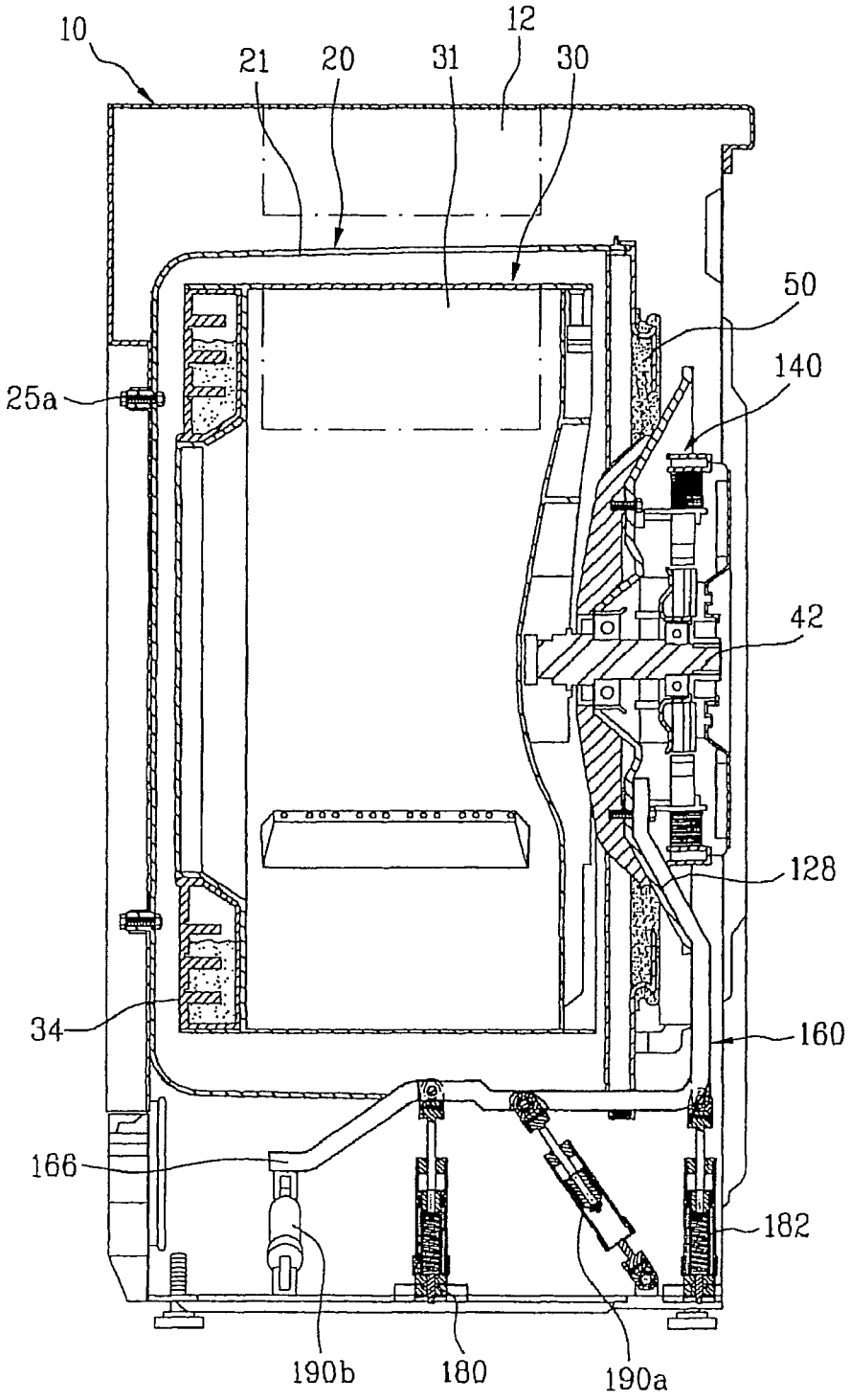
FIG. 8 is a cross-sectional diagram of a drum type washing machine according to a further embodiment of the present invention.
Figure 10:
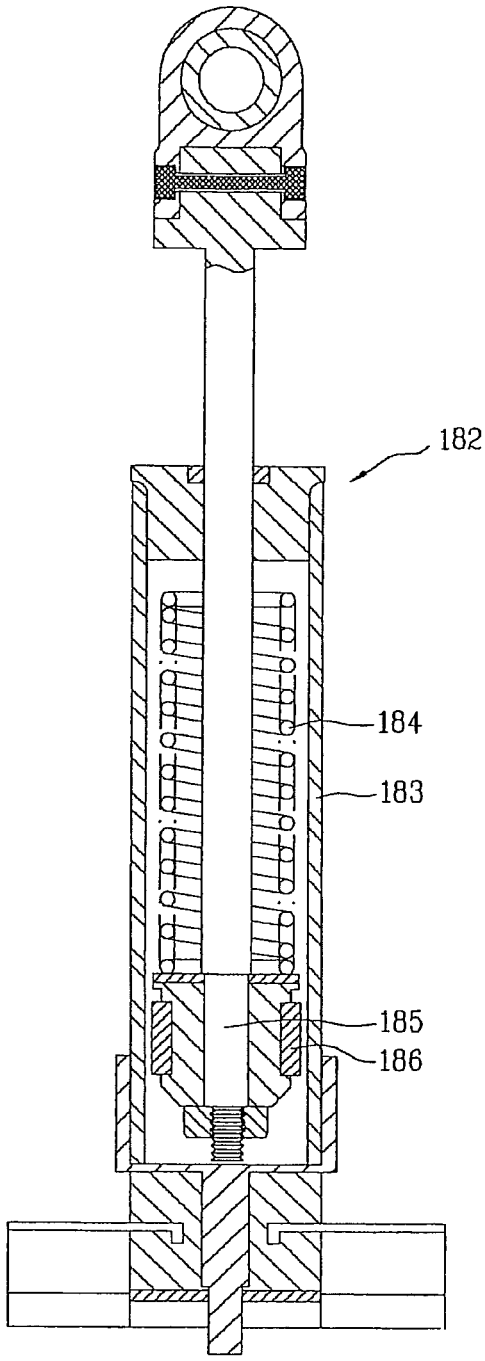
FIG. 10 is a cross-sectional diagram of a rear damper shown in FIG. 9.

FIGS. 8 to 10 are diagram of a drum type washing machine according to a further embodiment of the present invention.

In describing a drum type washing machine according to a further embodiment of the present invention, the same names and reference numbers shall be used for the same parts of the former embodiment.

Referring to FIGS. 8 to 10, a drum type washing machine according to a further embodiment of the present invention includes a cabinet 10 defining an exterior of the drum type washing machine, a tub 20 fixed within the cabinet 10 to store water therein, a drum 30 rotatably provided within the tub 20, a motor assembly 140 provided next to one side of the drum 30 to rotate the drum 30, and a suspension assembly 160 provided to support a weight of the drum 30 and attenuate vibration of the drum 30.

A laundry loading entrance 21 is provided to an outer circumference of the tub 20 to load and unload laundry. And, a door assembly 31 is provided to a specific portion of the drum 30 to communicate with the laundry loading entrance 21.

Moreover, a door 12 may be provided to a specific portion of the cabinet to communicate with the laundry loading entrance 21.

Since the cabinet 10, the tub 20, the drum 30 and the motor assembly 140 of the drum type washing machine according to the further embodiment of the present invention are identical to those of the drum type washing machine according to the former embodiment of the present invention, the corresponding descriptions are referred to in the previous description for convenience of explanation.

Meanwhile, the suspension assembly 160 of the drum type washing machine according to the further embodiment of the present invention includes a damper bracket joined to the bearing housing 128 and an attenuating part joined to the damper bracket to attenuate vibration. In this case, the attenuating part supports a weight of the drum 30 and a weight of the motor assembly 140 driving the drum 30.

The attenuating part may include a main damper 180 supporting the weight of the drum 30 to attenuate vertical vibration and a rear damper 182 attenuating the vertical vibration of the drum to prevent the drum 30 from inclining to one side.

And, the damper bracket may include at least one main damper bracket 164 joined to the main damper 180 and a rear damper bracket 168 joined to the rear damper 182.

Preferably, the at least one main damper bracket 164 joined to the main damper 180 extends from the bearing housing 128 to an outside of an outer circumference of the tub 20 toward each lower lateral side of the tub 20 in a direction of a diameter of the tub 20 and then extends toward a front side of the tub 20 to a prescribed length. And, the main damper 180 is preferably joined to an end portion of the extending portion of the main damper bracket 164.

Preferably, the main damper 180 is provided vertical to the base 16. This is because the main damper 180 plays a role in supporting vertical weights of the drum 30, bearing housing 128 and motor assembly 140 and attenuating the vertical vibration.

In particular, a pair of main damper brackets 164 are provided to extend from both lateral sides of the bearing housing 128 toward the front side of the tub 20, respectively. And, a pair of main dampers 180 are provided to be joined to a pair of the main damper brackets 164, respectively.

Since each of the above-configured main dampers 180 has the same configuration of the aforesaid main damper 80 of the former embodiment of the present invention, its details are omitted in the following description.

Preferably, one end of the rear damper bracket 168 joined to the rear damper 182 is fixed to a lower center of the bearing housing 128 and the other end is configured to extend to a prescribed length toward the base 16. And, the rear damper 182 is vertically joined to an end portion of the other end of the rear damper bracket 168.

FIG. 8 is a cross-sectional diagram of a drum type washing machine according to a further embodiment of the present invention. For convenience of explanation, the main damper bracket 164 is represented as a perspective diagram instead of a cross-sectional diagram.

The main damper 180, as shown in FIG. 9, is provided under each of both of the lower sides of the drum 30 and the rear damper 182 is provided under a rear side of the drum 30. In this case, since a pair of the main dampers 180 are provided under both of the lower sides of the drum 30, the pair of main dampers 180 and the rear damper 182 are provided to configure a triangle.

Namely, three dampers are provided to attenuate the vertical vibration of the drum 30.

The rear damper 182 is the element that prevents the drum 30 from inclining to a front or rear side of the drum 30. Generally, the drum 30 tends to incline to one side owing to a center of weight. Since the heavy motor assembly 140 is normally provided next to the backside of the drum 30, the center of weight of the drum 30 lies in a rear part of the drum 30 rather than a central part of the drum 30 when the drum 30 is empty.

Hence, a pair of the main dampers 180 and the rear damper 182 prevent the drum 30 from drooping while supporting the weight of the drum 30.

In this case, the function and configuration of the rear damper 182 may vary according to an installed position of the corresponding main damper 180.

In particular, if the main damper 180 is provided to a position enabling the empty drum 30 to keep its balance, when laundry and water are loaded in the drum 30, the drum 30 inclines forward while a rear side of the drum 30 relatively rises upward.

In this case, the rear damper 182, as shown in FIG. 10, preferably includes a cylinder 183, a piston 185 reciprocating within the cylinder 183 to attenuate vibration, a frictional member 186 attached to the piston 185, and a spring 184 supporting the piston 185 to provide an elastic force when the piston 185 is pulled out, thereby elastically pulling down the rear side of the drum 30 not to rise. Alternatively, the rear damper 182 may be configured identical to that shown in FIG. 6 to provide an elastic force when the spring 85 is pulled.

If the rear side of the drum 30 is designed to fall when laundry and water are loaded in the empty drum 30 tending to incline backward, the rear damper 182, as shown in FIG. 6, preferably includes the cylinder 82, the piston 83 reciprocating within the cylinder 82 to attenuate vibration, and the spring 85 supporting the piston 83 to activate an elastic force when the piston 83 enters the cylinder 82. In particular, the rear damper 182 elastically supports the rear side of the drum 30 to prevent the rear side of the drum 30 from falling downward.

In this case, positions for installing the main dampers 180 and the rear damper 182 are preferably decided to enable a center of weight working by the drum 30, the motor assembly 140, and the like to exist within the triangle configured by the main dampers 180 and the rear damper 182.

Although the other end portions of the side for joining the main damper brackets 164 of the main dampers 180 and the rear damper 182 and the sub-damper bracket 166 thereto may be directly joined to the base 16, the forming parts ('16a' in FIG. 5) or the reinforcing plates 116 of the former embodiments may be provided to prevent the transformation of the base 16.

Meanwhile, the suspension assembly of the present embodiment may further include sub-dampers 190a and 190b attenuating the horizontal vibration of the drum 30 in addition to the main dampers 180 and the rear damper 182 that attenuate the vertical vibration by supporting the weight of the drum 30.

The horizontal vibration of the drum 30 includes a front-to-rear vibration of the drum 30 and a right-to-left vibration of the drum 30. And, the horizontal vibration tends to be generated in case that the drum 30 is in an over-vibrating state.

To attenuate the horizontal vibration, the sub-dampers 190a and 190b may be provided to incline in a front-to-rear or right-to-left direction.

In particular, if the sub-damper 190a is provided to incline in the front-to-rear direction, the front-to-rear horizontal vibration of the drum 30 will be attenuated. If the sub-damper 190b is provided to incline in the right-to-left direction, the right-to-left horizontal vibration of the drum 30 will be attenuated.

Of course, either the sub-damper 190a or the sub-damper 190b may be selectively provided to incline in either the front-to-rear direction or the right-to-left direction. Alternatively, both of the sub-dampers 190a and 190b may be provided to incline in the front-to-rear direction and the right-to-left direction, respectively.

Preferably, one end of the sub-dampers 190a and 190b are hinged to one side of the main damper bracket 164 and the other end of the sub-dampers 190a and 190b are hinged to the base 16.

A sub-damper bracket 166 joined to the sub-dampers 190a and 190b may be separately provided. The sub-damper bracket 166 may be configured to be joined to the main damper bracket 164. Alternatively, the sub-damper bracket (not shown in the drawing) may be configured to be directly joined to the bearing housing 128.

The above-configured sub-dampers 190a and 190b may have the same configurations of the aforesaid sub-dampers 190a and 190b of the former embodiment of the present invention.

In the drum type washing machine according to the further embodiment of the present invention, since the tub 20 is directly fixed to the cabinet 10 so as not to fluctuate, the tub 20 may avoid colliding with the cabinet 10. Hence, a diameter of the tub 20 may be increased to extend a capacity or volume of the drum 30.

Since one side of the rotating drum 30 is supported instead of both sides of the rotating drum 30, an internal volume of the drum 30 may be further extended and the number of parts may be reduced. Hence, productivity may be enhanced.

Since the drum 30 is supported by three points using the main dampers 180 and the rear damper 182, the drum 30 may be prevented from inclining to one side according to the variation of the center of weight attributed to the loaded laundry and water.

Since the sub-dampers 190a and 190b are provided to attenuate the front-to-rear and right-to-rear directional vibrations, it is able to effectively suppress the horizontal vibration of the drum 30.

Accordingly, the embodiment of the present invention provides the following effects or advantages.

First of all, since a tub is directly fixed to a cabinet so as not to fluctuate, it is able to increase a diameter of the tub. Hence, a volume or capacity of a drum may be considerably increased.

Secondly, since a laundry loading entrance and a door assembly are provided on a lateral side of an outer circumference of a drum to load and unload laundry in the drum instead of a front side of the drum, a user does not bend over to load the laundry in the drum and is able to conveniently look down on an inside of the drum. Hence, the present invention enhances user's convenience.

Thirdly, a rotational shaft and a motor assembly to rotate a drum are provided to one side of the drum only and one side of the drum is supported only. So, it is unnecessary to support both ends of the drum. Hence, a volume or capacity of the drum may be increased.

Fourthly, a front side of a tub is directly joined and fixed to an inner surface of a front side of a cabinet. In case that vibration or shock is delivered to the tub assembled in one body of the cabinet, a weight of the cabinet is added to increase rigidity of the tub rather than the tub shaking because of the vibration or shock. Hence, an overall vibration characteristic of a drum type washing machine may be enhanced.

It will be apparent to those skilled in the art that various modifications and variations may be made without departing from the spirit or scope of the inventions. Thus, it is intended that the claims cover the modifications and variations of this invention provided they come within the scope of the claims and their equivalents.

What is claimed is:

[1. A drum type washing machine comprising:

a cabinet forming an exterior of the drum type washing machine;

a tub fixed within the cabinet, the tub defining a space where water for washing laundry is held and having a laundry loading entrance at an outer circumference of the tub;

a drum rotatably provided within the space of the tub, the drum having an opening on a lateral circumferential side thereof to communicate with the laundry loading entrance of the tub;

a motor assembly provided next to one side of the drum to rotate the drum the motor assembly including a rotational shaft connected to the drum;

a plate through which the rotational shaft passes, the plate covering part of the space of the tub;

a gasket connected between the tub and the plate, the gasket covering part of the space of the tub therebetween; and a suspension assembly provided to support a weight of the drum and attenuate vibration of the drum.]

[2. The drum type washing machine of claim 1, the motor assembly comprising:

a motor generating a rotational force;

and a bearing housing rotatably supporting the rotational shaft, and the suspension assembly comprising:

at least one damper bracket extending from the bearing housing; and an attenuating part provided between the at least one damper bracket and the cabinet to support the drum via the at least one damper bracket.]

[3. The drum type washing machine of claim 2, the attenuating part comprising a pair of main dampers provided to support the weight of the drum and attenuate vertical vibration of the drum.]

[4. The drum type washing machine of claim 3, the attenuating part further comprising a sub-damper provided to attenuate horizontal vibration of the drum.]

[5. The drum type washing machine of claim 4, wherein the at least one damper bracket is configured to be bent toward a front side of the tub from a center of the bearing housing and wherein one end of the sub-damper is joined to an end portion of the at least one damper bracket.]

[6. The drum type washing machine of claim 4, wherein the sub-damper is connected to both of the at least one damper bracket and the cabinet.]

[7. The drum type washing machine of claim 3, the attenuating part further comprising an elastic member connecting the bearing housing on a topside of the cabinet.]

[8. The drum type washing machine of claim 3, the at least two main dampers, each comprising:

a cylinder;

a piston provided to reciprocate within the cylinder according to a motion of the drum to attenuate the vibration of the drum; and a spring configured to elastically support the piston.]

[9. The drum type washing machine of claim 8, wherein a frictional member is provided to an outer circumference of the piston to attenuate the vibration by making a frictional movement against an inner circumference of the cylinder according to a motion of the piston.]

[10. The drum type washing machine of claim 8, wherein each of the at least two main dampers is connected to the corresponding damper bracket.]

[11. The drum type washing machine of claim 2, the attenuating part comprising at least three dampers provided to support the weight of the drum and attenuate vertical vibration of the drum.]

[12. The drum type washing machine of claim 11, the attenuating part comprising:

at least two main dampers provided to support the weight of the drum; and at least one rear damper provided to prevent the drum from inclining to one side.]

[13. The drum type washing machine of claim 12, wherein the rear damper is configured to prevent the drum from inclining to a front or rear side of the drum.]

[14. The drum type washing machine of claim 12, the at least one damper bracket comprising a rear damper bracket configured to extend from the bearing housing to a center of a lower outer circumference of the tub to be joined to the at least one rear damper.]

[15. The drum type washing machine of claim 14, wherein each of the at least two main dampers is connected to the corresponding main damper bracket and wherein the rear damper is hinged to the rear damper bracket.]

[16. The drum type washing machine of claim 12, the at least two main dampers, each comprising:

a cylinder;

a piston provided to reciprocate within the cylinder according to a motion of the drum to attenuate the vibration of the drum; and a spring configured to support the piston and have an elastic force when the piston enters the cylinder.]

[17. The drum type washing machine of claim 12, the rear damper comprising:

a cylinder;

a piston provided to reciprocate within the cylinder according to a motion of the drum to attenuate the vibration of the drum; and a spring configured to support the piston and have an elastic force when the piston is pulled out of the cylinder.]

[18. The drum type washing machine of claim 11, further comprising a sub-damper provided to attenuate horizontal vibration of the drum.]

[19. A drum type washing machine comprising:

a cabinet forming an exterior of the drum type washing machine;

a tub fixed within the cabinet, the tub having a laundry loading entrance at an outer circumference of the tub;

a drum rotatably provided within the tub, the drum having an opening on a lateral circumferential side of the drum to communicate with the laundry loading entrance of the tub;

a motor assembly provided next to one side of the drum to rotate the drum, the motor assembly including a rotational shaft connected to the drum and a bearing housing to rotatably support the rotational shaft; and a suspension assembly provided to support a weight of the drum and attenuate vibration of the drum, wherein the suspension assembly includes at least one damper bracket which is configured to be bent toward a front side of the tub from the bearing housing and a damper which is connected to the at least one damper bracket.]

[20. A drum type washing machine comprising:

a cabinet forming an exterior of the drum type washing machine;

a tub fixed within the cabinet, the tub having a laundry loading entrance at an outer circumference of the tub;

a drum rotatably provided within the tub, the drum having an opening on a lateral circumferential side of the drum to communicate with the laundry loading entrance of the tub;

a motor assembly provided next to one side of the drum to rotate the drum, the motor assembly including a rotational shaft connected to the drum and a bearing housing to rotatably support the rotational shaft; and a suspension assembly provided to support a weight of the drum and attenuate vibration of the drum, the suspension assembly comprising at least two damper brackets and at least two dampers, wherein each of the at least two damper brackets extends from the bearing housing to an outside of each lower side of an outer circumference of the tub, and is bent toward a front side of the drum, and extends to a prescribed length, and the two dampers are connected to the two damper brackets, respectively.]

*21. A drum type washing machine, comprising:*

*a tub configured to hold water therein, wherein the tub is fixed to a cabinet;*

*a drum rotatably placed in the tub;*

*a shaft connected to the drum;*

*a bearing housing that rotatably supports the shaft;*

*a motor that rotates the shaft;*

*a gasket that seals an opening of the tub and allows the bearing housing to move relatively to the tub; and*

*a suspension connected to the bearing housing, the suspension comprising at least one bracket that extends in a lateral direction with respect to a direction that a rotational axis of the drum extends, and another bracket that connects the at least one bracket to the bearing housing, wherein the another bracket extends in the direction that the rotational axis of the drum extends, and the at least one bracket is connected to the another bracket at a position opposite to the bearing housing with respect to the direction that the rotational axis of the drum extends.*

*22. The drum type washing machine of claim 21, wherein the suspension further comprises at least one damper connected to the laterally extending bracket.*

*23. The drum type washing machine of claim 22, wherein the at least one damper is connected to the laterally extending bracket at a position vertically aligned with the rotational axis.*

*24. The drum type washing machine of claim 22, wherein the at least one damper comprises a non-spring damper.*

*25. The drum type washing machine of claim 22, wherein the at least one damper is connected to the laterally extending bracket hingedly at both ends.*

*26. The drum type washing machine of claim 21, wherein the laterally extending bracket is configured to be positioned higher at a portion further spaced away from the rotational axis.*

*27. The drum type washing machine of claim 21, wherein the laterally extending bracket is configured to cross the rotational axis thereunder.*

*28. The drum type washing machine of claim 21, wherein the another bracket comprises a pair of brackets.*

*29. The drum type washing machine of claim 21, wherein the suspension comprises a pair of dampers provided at both lateral sides with respect to the rotational axis, and the laterally extending bracket is arranged at a side of the pair of dampers opposite to the shaft.*

*30. The drum type washing machine of claim 21, wherein the suspension further comprises a damper vertically provided at a position vertically aligned with the rotational axis.*

*31. The drum type washing machine of claim 21, wherein the laterally extending bracket is flat at both ends.*

*32. A drum type washing machine, comprising:*

*a tub configured to hold water therein, wherein the tub is fixed to a cabinet;*

*a drum rotatably placed in the tub;*

*a shaft connected to the drum;*

*a bearing housing that rotatably supports the shaft;*

*a motor that rotates the shaft;*

*a gasket that seals an opening of the tub and allows the bearing housing to move relatively to the tub; and*

*a suspension assembly connected to the bearing housing that reduces vibration of the drum, the suspension assembly comprising at least one bracket that extends in a lateral direction with respect to a direction that a rotational axis of the drum extends and another bracket that connects the at least one bracket to the bearing housing, wherein the another bracket extends in the direction that the rotational axis of the drum extends, and the at least one bracket is connected to the another bracket at a position opposite to the bearing housing with respect to the direction that the rotational axis of the drum extends.*

*33. The drum type washing machine of claim 32, wherein the suspension assembly further comprises at least one damper connected to the laterally extending bracket.*

* * * * *